US008428670B2

(12) United States Patent
Mukai et al.

(10) Patent No.: US 8,428,670 B2
(45) Date of Patent: Apr. 23, 2013

(54) RECEPTION DEVICE, ANTENNA, AND JUNCTION CABLE

(75) Inventors: Koichi Mukai, Ishikawa (JP); Yoshitaka Yoshino, Tokyo (JP); Chisato Komori, Ishikawa (JP)

(73) Assignee: Sony Corporation, Tokyo (JP)

( * ) Notice: Subject to any disclaimer, the term of this patent is extended or adjusted under 35 U.S.C. 154(b) by 1065 days.

(21) Appl. No.: 12/099,907

(22) Filed: Apr. 9, 2008

(65) Prior Publication Data

US 2008/0254831 A1 Oct. 16, 2008

(30) Foreign Application Priority Data

Apr. 11, 2007 (JP) ................................ 2007-104112
Apr. 16, 2007 (JP) ................................ 2007-106810

(51) Int. Cl.
*H04M 1/00* (2006.01)

(52) U.S. Cl.
USPC .................. 455/575.7; 455/569.1; 455/569.2; 455/575.6; 455/575.2

(58) Field of Classification Search ............... 455/562.1, 455/575.7, 550.1–575.9, 77, 82, 87, 90.1–90.3
See application file for complete search history.

(56) References Cited

U.S. PATENT DOCUMENTS 4,459,597 A * 7/1984 Blaese .......................... 343/900
6,317,086 B1 * 11/2001 Woo .............................. 343/702
6,408,190 B1 * 6/2002 Ying .......................... 455/553.1
7,412,255 B2 * 8/2008 Klemetti et al. ........... 455/553.1
2003/0112191 A1 * 6/2003 Maeda et al. ................. 343/715
2006/0071869 A1 * 4/2006 Yoshino et al. ............... 343/718
2006/0227055 A1 * 10/2006 Komoto et al. ............... 343/702
2007/0127741 A1 * 6/2007 Kimura et al. ................ 381/111
2007/0274530 A1 * 11/2007 Buil et al. ....................... 381/74
2009/0015505 A1 * 1/2009 Nagano et al. ................ 343/850
2009/0131129 A1 * 5/2009 Yamazaki et al. ......... 455/575.7
2009/0209217 A1 * 8/2009 Coersmeier et al. .......... 455/142

FOREIGN PATENT DOCUMENTS

JP 61-046601 3/1986
JP 09-312894 12/1997
JP 2005-064742 3/2005

(Continued)

OTHER PUBLICATIONS

Japanese Office Action dated Aug. 5, 2011 for Japanese Application No. 2007-104112.

(Continued)

*Primary Examiner* — Patrick Edouard
*Assistant Examiner* — Ronald Eisner
(74) *Attorney, Agent, or Firm* — SNR Denton US LLP

(57) ABSTRACT

A reception device including a transmission part having transmission cables transmitting a signal and/or power of a main-body device, an antenna part provided along the transmission cables from main-body-device-side ends of the transmission cables to a point between the main-body-device-side ends and the other ends of the transmission cables so that a high-frequency-signal-transmission path is formed, a high-frequency-elimination circuit provided at the main-body-device-side ends, which eliminates entry of the high-frequency signal to the main-body device, and a tuner that connects one of ends of the antenna part, the end being provided on the main-body-device side, to an antenna-input terminal and that receives a broadcast wave falling within the first frequency band corresponding to the antenna part's length is provided. The other end of the antenna part is an open end.

9 Claims, 25 Drawing Sheets

FOREIGN PATENT DOCUMENTS

| | | |
|---|---|---|
| JP | 2005-333613 | 12/2005 |
| JP | 2006-025392 | 1/2006 |
| JP | 2006-108942 | 4/2006 |
| JP | 2007-173980 | 7/2007 |
| JP | 2006-222892 | 10/2011 |

OTHER PUBLICATIONS

Japanese Office Action dated Aug. 5, 2011 for Japanese Application No. 2007-106810.

* cited by examiner

| FREQUENCY | 76 | 86 | 95 | 107 | 188.5 | 192.5 | 194.5 | 198.5 |
|---|---|---|---|---|---|---|---|---|
| GAIN | -11.93 | -10.22 | -11.66 | -11.73 | -12.15 | -11.22 | -11.24 | -11.53 |

| FREQUENCY | 76 | 86 | 95 | 107 | 188.5 | 192.5 | 194.5 | 198.5 |
|---|---|---|---|---|---|---|---|---|
| GAIN | -11.93 | -10.22 | -11.66 | -11.73 | -12.15 | -11.22 | -11.24 | -11.53 |

| FREQUENCY | 76 | 86 | 95 | 107 | 188.5 | 192.5 | 194.5 | 198.5 |
|---|---|---|---|---|---|---|---|---|
| GAIN | -21.66 | -23.42 | -24.26 | -19.03 | -17.65 | -17.75 | -18.39 | -19.73 |

| FREQUENCY | 76 | 86 | 95 | 107 | 188.5 | 192.5 | 194.5 | 198.5 |
|---|---|---|---|---|---|---|---|---|
| GAIN | -17.78 | -17.22 | -17.26 | -15.26 | -17.02 | -17.24 | -17.12 | -15.26 |

| FREQUENCY | 76 | 86 | 95 | 107 | 188.5 | 192.5 | 194.5 | 198.5 |
|---|---|---|---|---|---|---|---|---|
| GAIN | -17.78 | -17.22 | -17.26 | -15.26 | -17.26 | -18.04 | -17.15 | -15.26 |

| FREQUENCY | 76 | 86 | 95 | 107 | 188.5 | 192.5 | 194.5 | 198.5 |
|---|---|---|---|---|---|---|---|---|
| GAIN | -20.66 | -23.42 | -25.26 | -22.32 | -17.02 | -17.24 | -17.12 | -16.67 |

| | TOTAL | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -17.08 | -13.62 | -13.46 | -14.19 | -6.97 | -5.70 | -5.40 | -5.37 |

| | VERTICAL POLARIZATION | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -17.08 | -13.62 | -13.46 | -14.19 | -6.97 | -5.70 | -5.40 | -5.37 |

| | HORIZONTAL POLARIZATION | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -22.28 | -21.82 | -25.86 | -21.59 | -14.07 | -13.64 | -13.67 | -14.57 |

| | TOTAL | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -18.38 | -16.42 | -17.45 | -16.19 | -13.57 | -14.37 | -15.22 | -15.57 |
| AVERAGE (dBd) | -22.77 | -21.82 | -23.18 | -21.51 | -18.04 | -18.35 | -18.81 | -19.28 |

| | VERTICAL POLARIZATION | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -18.38 | -16.42 | -17.45 | -16.19 | -13.57 | -14.37 | -15.22 | -16.57 |
| AVERAGE (dBd) | -21.10 | -19.21 | -20.37 | -19.30 | -17.47 | -18.26 | -18.91 | -19.39 |

| | HORIZONTAL POLARIZATION | | | | | | | |
|---|---|---|---|---|---|---|---|---|
| FREQUENCY (MHz) | 76 | 86 | 96 | 107 | 188.5 | 192.5 | 194.5 | 198.5 |
| PEAK (dBd) | -20.86 | -24.62 | -28.96 | -22.00 | -15.07 | -14.84 | -15.27 | -15.57 |
| AVERAGE (dBd) | -25.52 | -29.31 | -33.61 | -26.27 | -18.70 | -18.45 | -18.71 | -19.16 |

RECEPTION DEVICE, ANTENNA, AND JUNCTION CABLE

CROSS REFERENCES TO RELATED APPLICATIONS

The present invention contains subject matter related to Japanese Patent Application JP 2007-104112 filed in the Japanese Patent Office on Apr. 11, 2007 and Japanese Patent Application JP 2007-106810 filed in the Japanese Patent Office on Apr. 16, 2007, the entire contents of which are incorporated herein by reference.

BACKGROUND OF THE INVENTION

1. Field of the Invention

The present invention relates to a reception device, an antenna, and a junction cable and can be used for a mobile-phone system that can receive a digital-radio broadcast, etc. According to the present invention, one of sides of a path provided to transmit a high-frequency signal is used as an antenna ready for a specified frequency band, the side extending from a main-body device to a predetermined point, and the other side of the path is assigned as a path provided to transmit an audio signal, etc., so that an antenna achieved to be mechanically strong, finely designed, and high performance by using a simpler configuration than in the past, a reception device using the antenna, and a junction cable that can be used for the antenna are proposed.

2. Description of the Related Art

Heretofore, many ideas relating to an antenna have been embodied in mobile reception devices. Namely, it is desirable that antennas used for mobile reception devices or the like do not compromise the design of the mobile reception devices, reduce effects produced on the human body, resist damages caused by noises emitted from electronic gear, etc.

In the past, regarding the design problem, the antennas were included in the reception devices, so as not to comprise the design of the reception devices. However, since the antennas are increased in size in an ultra-high-frequency (UHF) band and a very-high-frequency (VHF), it was difficult to include the antennas in the reception devices. In the past, therefore, the reception devices used in the UHF band and the VHF band were usually provided with rod antennas. However, when the rod antenna is provided in the reception device, the configuration of the reception device becomes complicated. Further, the rod antenna juts out the reception device so that the design of the reception device is compromised, for example.

Accordingly, various types of methods of using an earphone cable as the antenna have been proposed in recent years. However, when the earphone cable is simply used as the antenna, the earphone cable is brought into contact with the human body, as shown in FIG. 42. Further, since various parts of the earphone cable are brought in contact with the human body, it has been difficult to make full use of functions of the antenna.

Therefore, various ideas of making it difficult for a part of the earphone cable to function as the antenna, the parts being brought into contact with the human body, have been proposed. For example, according to Japanese Unexamined Patent Application Publication No. 2005-64742, Japanese Unexamined Patent Application Publication No. 2006-25392, and Japanese Patent No. 3851339, a part of the earphone cable is formed as a coaxial cable, the part being provided on the reception-device side.

According to the above-described methods, however, a high-frequency-elimination element which eliminates the entry of a high-frequency signal to a specified region should be provided in a connection part where a non-antenna part and an antenna part of the earphone cable are connected to each other. Subsequently, the configuration of the connection part becomes more complicated and the mechanical strength of the earphone cable deteriorates at the connection part. Further, the design of the reception device is limited. Still further, when the high-frequency-elimination element is provided in the connection part, a direct-current resistance occurring in an audio-signal-transmission path is increased, and sound-output characteristics of the earphone cable are deteriorated. Therefore, the performance of the earphone cable using the above-described methods is not sufficient in practice.

SUMMARY OF THE INVENTION

Accordingly, the present invention proposes an antenna achieved to be mechanically strong, finely designed, and high performance by using a simpler configuration than in the past, a reception device using the antenna, and a junction cable that can be used for the antenna.

A reception device according to an embodiment of the present invention includes a transmission part including a plurality of transmission cables configured to transmit a signal and/or power generated in a main-body device, an antenna part that is provided along the transmission cables from ends of the transmission cables, the ends being provided on the main-body-device side, to a predetermined point between the main-body-device-side ends and the other ends of the transmission cables so that the antenna part and the transmission cables form a path used to transmit a high-frequency signal, a high-frequency-elimination circuit that is provided at the main-body-device-side ends of the transmission cables and configured to eliminate entry of the high-frequency signal from at least one of the transmission cables to the main-body device, and a tuner that is configured to connect one of ends of the antenna part, the end being provided on the main-body-device side, to an antenna-input terminal and that is configured to receive a broadcast wave falling within a first frequency band, where the first frequency band corresponds to a length of the antenna part, wherein the other end of the antenna part is an open end.

In the reception device, the antenna part is at least one cable provided along the transmission cables, and the transmission path includes parallel lines including the transmission cables and the cable of the antenna part.

In the reception device, the antenna part is a coating rod surrounding the transmission cables, and the transmission path is a coaxial transmission path including the transmission cables and the coating rod.

An antenna according to another embodiment of the present invention is connected to a main-body device configured to receive a broadcast wave falling within a predetermined frequency band, where the antenna includes a transmission part including a plurality of transmission cables configured to transmit a signal and/or power generated in the main-body device, and an antenna part that is provided along the transmission cables from ends of the transmission cables, the ends being provided on the main-body-device side, to a predetermined point between the main-body-device-side ends and the other ends of the transmission cables so that the antenna part and the transmission cables form a path used to transmit the broadcast wave. Further, according to the above-described antenna, the one of ends of the antenna part, the end being opposite to the other end provided on the main-body-device side, is an open end, the main-body-device-side ends of the transmission cables are connected to a high-frequency-elimination circuit that eliminates the entry of a high-frequency signal to the main-body device, and the main-body-device-side end of the antenna part is connected to an antenna-input terminal of a tuner unit configured to receive a broadcast wave falling within a first frequency band, where the first frequency band corresponds to the length of the antenna part.

In the above-described antenna, the antenna part is at least one cable provided along the transmission cables, and the transmission path includes parallel lines including the transmission cables and the cable of the antenna part.

Further, in the above-described antenna, the antenna part is a coating rod surrounding the transmission cables, and the transmission path is a coaxial transmission path including the transmission cables and the coating rod.

A junction cable according to another embodiment of the present invention is configured to relay a signal and/or power generated in a main-body device including a tuner to an external cable, where one of ends of the junction cable is connected to the main-body device via a connecter, and the other end of the junction cable is connected to the external cable. The junction cable includes a transmission part including a plurality of transmission cables configured to transmit the signal and/or the power, and an antenna part that is provided along the transmission cables so that the antenna part and the transmission cables form a path used to transmit a broadcast wave, wherein one of ends of the antenna part, the end being provided on the external-cable side, is an open end, wherein ends of the transmission cables, the ends being provided on the main-body-device side, are connected to a high-frequency-elimination circuit via the connecter, where the high-frequency-elimination circuit is configured to eliminate entry of a high-frequency signal to the main-body device, and wherein the other end of the antenna part, the end being provided on the main-body-device side, is connected to an antenna-input terminal of the tuner configured to receive a broadcast wave falling within a first frequency band via the connector, where the first frequency band corresponds to a length of the antenna part.

In the above-described junction cable, the antenna part is at least one cable provided along the transmission cables, and the transmission path includes parallel lines including the transmission cables and the cable of the antenna part.

In the above-described junction cable, the antenna part is a coating rod surrounding the transmission cables, and the transmission path is a coaxial transmission path including the transmission cables and the coating rod.

According to the above-described embodiments, the transmission path includes the transmission part and the antenna part. Therefore, when a high-frequency signal is transmitted, sufficient isolation between the transmission part and the antenna part can be ensured so that only the cable of the antenna part functions as the antenna. At that time, since the base part of the main-body device is determined to be a feeding point and the cable of the antenna part extends to some midpoint on the transmission part, it becomes possible to prevent the cable of the antenna part from being brought into contact with the human body even though the transmission cables of the transmission part are brought into contact with the human body. Subsequently, a broadcast wave falling within the frequency band corresponding to the cable of the antenna part can be received with increased efficiency. Further, the high-frequency-elimination circuit may not be provided at the end of the antenna part, the end being provided on a side opposite to the main-body-device side. Subsequently, as for each of the reception device, the antenna, and the junction cable, the configuration is simplified, the mechanical strength is increased, and the design is more sophisticated. Further, an increase in the direct-current resistance and the performance deterioration during the audio-signal transmission can be reduced.

Further, according to the above-described embodiments, the transmission path can be specifically formed as the parallel lines.

Further, according to the above-described embodiments, the transmission path can be specifically formed as the coaxial-transmission path.

DESCRIPTION OF THE PREFERRED EMBODIMENTS

Embodiments of the present invention will be described in detail with reference to the attached drawings.

First Embodiment (1) Configuration of First Embodiment

Figure 1:
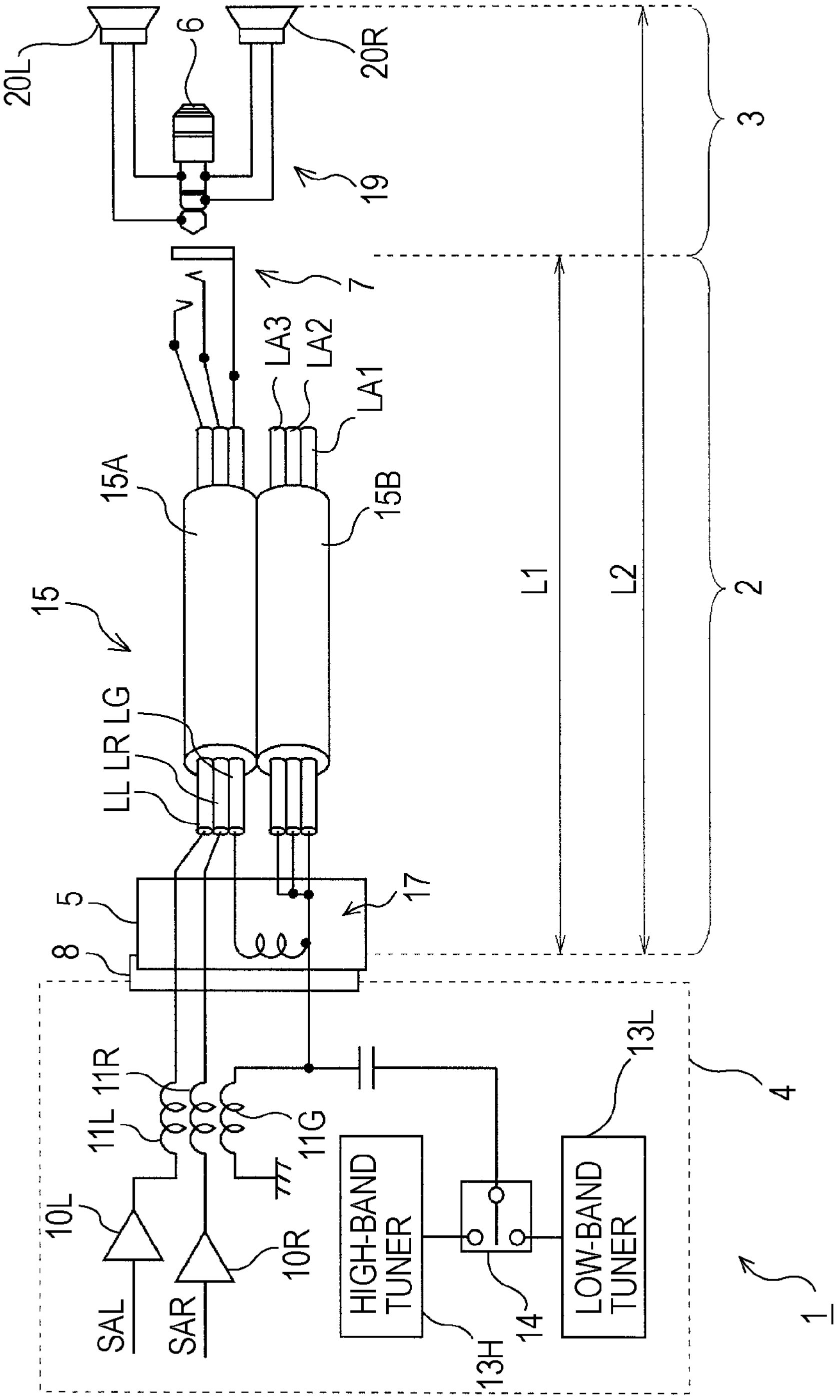
FIG. 1 is a block diagram illustrating a mobile-phone system according to an embodiment of the present invention.
Figure 2:
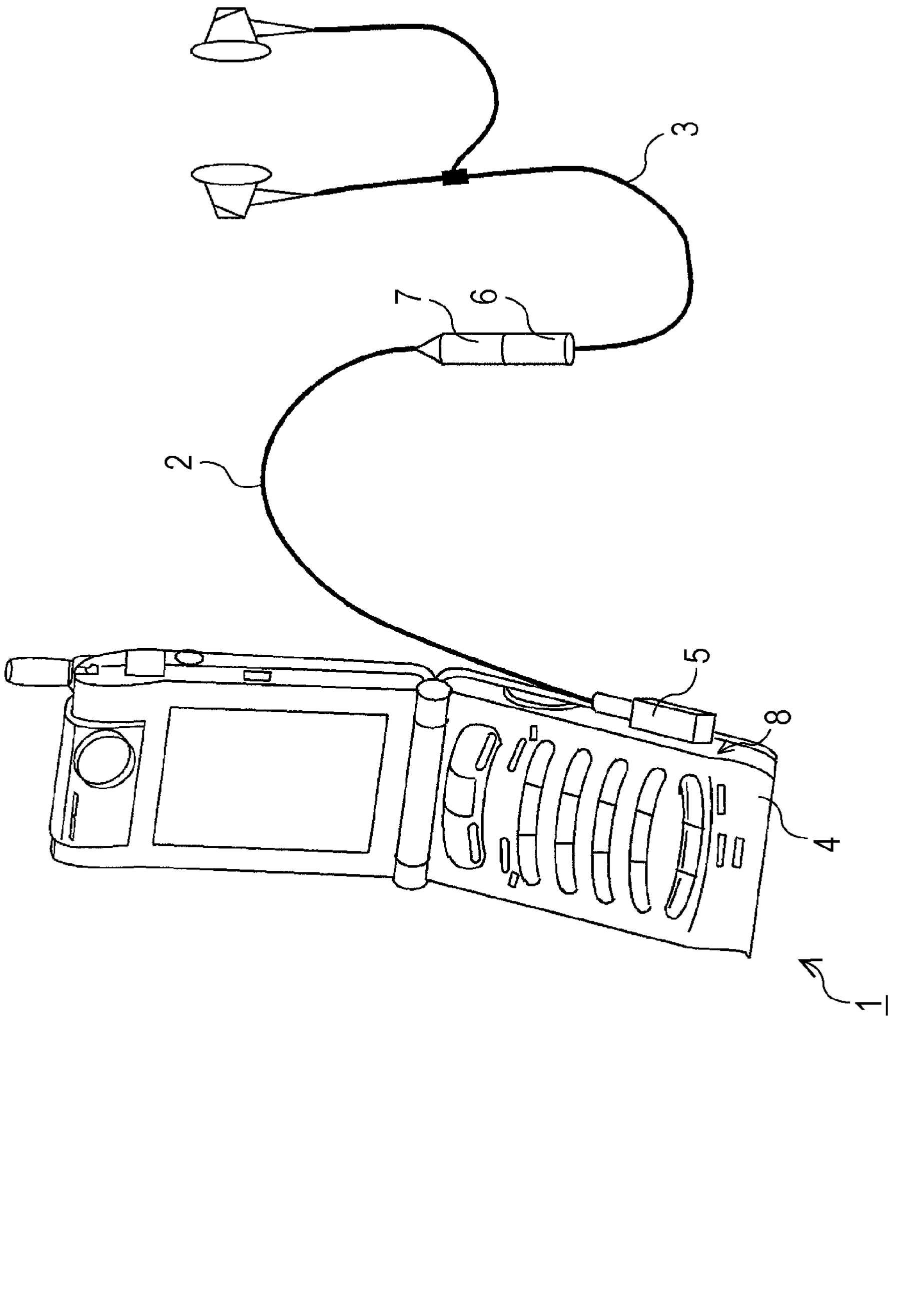
FIG. 2 is a perspective illustration of the mobile-phone system shown in FIG. 1.

FIG. 1 is a block diagram showing part of a mobile-phone system 1, which is a reception device according to an embodiment of the present invention. FIG. 2 is a perspective illustration of the mobile-phone system 1. The mobile-phone system 1 has the function of receiving a radio broadcast. When a set of earphones 3 is connected to a main-body device 4 via a junction cable 2, the radio broadcast can be received by using the above-described junction cable 2 and the set of earphones 3, as an antenna.

Therefore, the junction cable 2 includes a plug 5 connected to the main-body device 4 on its main-body-device-4 side, and a jack 7 on the earphone-3 side, where a plug 6 of the set of earphones 3 is connected to the jack 7. For supporting the above-described configuration, the main-body device 4 includes a jack 8 to which the plug 5 of the junction cable 2 is connected.

Here, in the main-body device 4, an amplifier circuit 10L amplifies an audio signal SAL of a left channel and an amplifier circuit 10R amplifies an audio signal SAR of a right channel, and each of the amplifier circuits 10L and 10R outputs the amplified signal to the jack 8. A high-frequency elimination circuit 11L is provided between the amplifier circuit 10L and the jack 8, and a high-frequency elimination circuit 11R is provided between the amplifier circuit 10R and the jack 8, which prevents the entry of a high-frequency signal from the jack 8 to the main-body device 4. On the other hand, a high frequency elimination circuit 11G grounds earth lines of the jack 8, where one of the earth lines corresponds to the audio signal SAL and the other corresponds to the audio signal SAR, so that the entry of a high-frequency signal transmitted from the junction cable 2 can be prevented. Further, in the first embodiment, each of the high frequency elimination circuits 11L, 11R, and 11G includes, for example, a chip inductor. However, each of the high frequency elimination circuits 11L, 11R, and 11G may include, for example, a low-pass filter including an inductor achieved by providing ferrite beads on an output line of each of the amplifier circuits 10L and 10R.

A high-band tuner 13H receives a digital radio broadcast including a broadcast waves falling within the band of a frequency of 190 [MHz]. A low-band tuner 13L receives a frequency modulation (FM) broadcast which is a broadcast wave in the band of frequencies of from 70 to 110 [MHz], and a voice signal generated by a low-band television broadcast. The main-body device 4 switches between operations of the above-described high-band tuner 13H and low-band tuner 13L according to operations performed by a user, and selectively connects an antenna-input end of each of the high-band tuner 13H and the low-band tuner 13L to the jack 8 via a selection circuit 14 and a capacitor 16.

Figure 3:
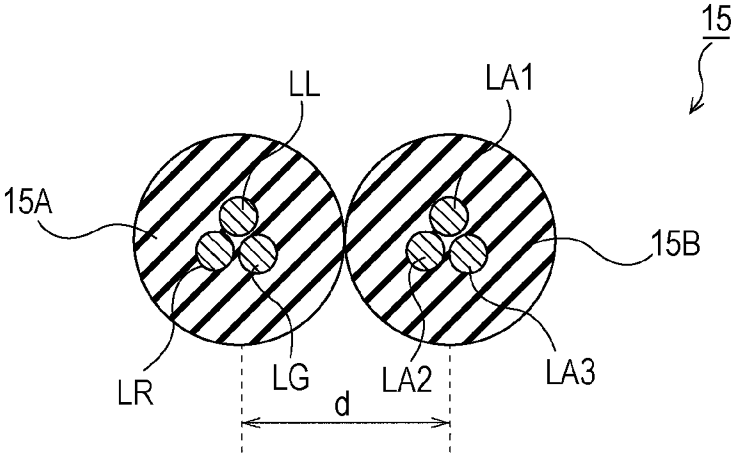
FIG. 3 is a sectional view of a junction cable.

Further, parallel Litz wires 15 are used for the junction cable 2, as shown in the sectional view of FIG. 3. Here, the parallel Litz wires 15 are parallel lines achieved by arranging first and second stranded-wire parts 15A and 15B so that the first and second stranded-wire parts 15A and 15B stand in parallel with each other at a predetermined distance d from each other. Each of the first and second stranded-wire parts 15A and 15B is formed by stranding at least two cables. In the first embodiment, the number of the cables is three. This is because the three cables is the least number of cables required to transfer audio signals of two channels, as analog signals. Here, each of the cables and the stranded-wire parts 15A and 15B is insulated by an insulator with a predetermined permittivity. In the first embodiment, the insulator includes polyurethane. More specifically, in the first embodiment, the distance d between the center parts of the above-described stranded-wire parts 15A and 15B is determined to be about 1.6 [mm]. Further, each of the stranded-wire parts 15A and 15B is formed by stranding polyurethane wires including aramid wires. In that case, the stranded-wire parts 15A and 15B form parallel lines which are almost equivalent to parallel lines, where each of the parallel lines includes a single wire which is 0.4 [mm] in radius in the center part thereof.

The first stranded-wire part 15A of the junction cable 2 is assigned as a transmission part configured to transmit an audio signal, and the second stranded-wire part 15B is assigned as an antenna part. The ends of the second stranded-wire part 15B, the ends being provided on the earphone-3 side, are open ends. Namely, each of three cables LA1, LA2, and LA3 of the second stranded-wire part 15B is not connected to any part. Further, the other ends of the second stranded-wire part 15B, the ends being provided on the main-body-device-4 side, are grouped and connected to an antenna terminal of the plug 5. In the main-body device 4, the antenna terminal is connected to the selection circuit 14 via the jack 8 and the capacitor 16.

On the other hand, two of three cables LL, LR, and LG of the first stranded-wire part 15A are connected to the amplifier circuits 10L and 10R via the plug 5, the jack 8, and the high frequency elimination circuits 11L and 11R. More specifically, ends of the cables LL and LR, the ends being provided on the main-body-device-4 side, are respectively connected to the amplifier circuits 10L and 10R. Further, the last cable LG of the first stranded-wire part 15A is connected to the cables LA1 to LA3 of the second stranded-wire part 15B at the joint of the plug 5 via a filter circuit 17 and connected to the high frequency elimination circuit 11G. Here, the impedance of the filter circuit 17 is sufficiently high in the band of frequencies received by the high-band tuner 13H, and sufficiently low in the band of frequencies of the audio signals SAL and SAR. Further, on the earphone-3-side, the above-described three cables LL, LR, and LG are connected, respectively, to the jack 7 at the parts corresponding to the cables LL, LR, and LG. Subsequently, in the first embodiment, both the capacitor 16 and the high frequency elimination circuit 11G form a separation circuit used to separate a high-frequency signal and an audio signal from each other.

In the above-described embodiment, even though the filter circuit 17 is provided, as a low-pass-filter circuit including the chip inductor, the filter circuit 17 may be provided, as various types of filter circuits including, for example, a band-pass filter in place of the low-pass-filter circuit.

As for the junction cable 2, connection between ends of the first and second stranded-wire parts 15A and 15B, the ends being provided on the plug-5-side, and connection between the junction cable 2 and the plug 5 are performed on a wiring board, and the jack 7 and the plug 5 are formed through molding by using a resin. The length L1 of the junction cable 2 is set to about 500 [mm] which is one-fourth of the wavelength of a predetermined frequency received by the high-band tuner 13H.

On the other hand, one of the ends of a cable 19 of the set of earphones 3, where the cable 19 has a predetermined length, is connected to the jack 7, and the other end of the cable 19 is connected to each of speakers 20L and 20R. The length L2 of from the plug 5 to each of the speakers 20L and 20R of the set of earphones 3 is set to 1200 [mm] which is about one-fourth of the length of a predetermined broadcast wave which falls within the band of frequencies received by the low-band tuner 13L. As is the case with the junction cable 2, a connection part of the plug 6 of the set of earphones 3 is formed through molding by using a resin, so as to hide the connection part to which the cables are connected.

(2) Operations of First Embodiment

In the above-described mobile-phone system 1 shown in FIG. 1, the high-band tuner 13H and/or the low-band tuner 13L starts performing operations according to an operation of the user, and the antenna-input end of the high-band tuner 13H and/or the low-band tuner 13L is connected to the junction cable 2 via the selection circuit 14. In the mobile-phone system 1, the junction cable 2 and/or the cable 19 of the set of earphones 3, which is connected to the junction cable 2, functions as an antenna so that a desired broadcast wave is received through the high-band tuner 13H and/or the low-band tuner 13L so that the audio signals SAL and SAR are reproduced. In the mobile-phone system 1, the audio signals SAL and SAR are output to the junction cable 2 by the amplifier circuits 10L and 10R, the speakers 20L and 20R are driven, and the voice of a broadcast wave received by the high-band tuner 13H and/or the low-band tuner 13L is presented to the user. Thus, the use of the mobile-phone system 1 allows for enjoying various types of contents of a broadcast through the set of earphones 3.

In the mobile-phone system 1, the audio signals SAL and SAR are output to the speakers 20L and 2OR via the high frequency elimination circuits 11L and 11R, the junction cable 2, and the cable 19 of the set of earphones 3 in sequence. Of the above-described components, the high frequency elimination circuits 11L and 11R are provided in the base part of the main-body device 4 so that the entry of a high-frequency signal to the main-body device 4 is prevented, where the high-frequency signal is induced by the cable 19, etc. Subsequently, it becomes possible to enjoy various types of contents by making, for example, the amplifier circuits 10L and 10R operate with stability.

On the other hand, in the junction cable 2, the cables LL, LR, and LG of the stranded-wire part 15A, which is one of the parallel lines forming the path used to transmit a high-frequency signal, form a path used to transmit the audio signals SAL and SAR, and a ground line used for the audio signal SAL and SAR. Subsequently, the audio signals SAL and SAR can be transmitted with stability.

Further, in the junction cable 2, each of the cables LA1 to LA3 of the stranded-wire part 15B, which is the other one of the parallel lines, is connected to the antenna-input end of the high-band tuner 13H and/or the low-band tuner 13L. Subsequently, the high-band tuner 13H and/or the low-band tuner 13L receives a broadcast wave due to a high-frequency signal induced by the cables LA1 to LA3 of the stranded-wire part 15B, which is the other one of the parallel lines of the junction cable 2.

Figure 4:
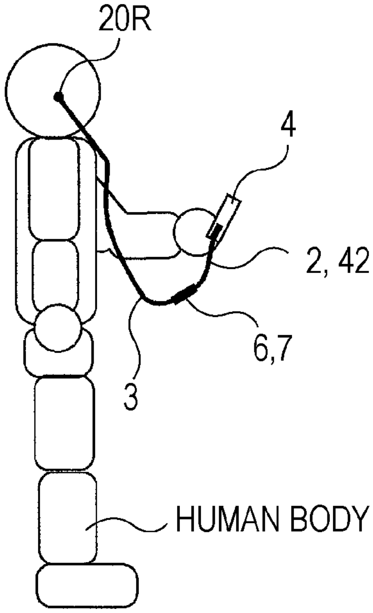
FIG. 4 is a schematic diagram illustrating an antenna used in the mobile-phone system shown in FIG. 1.

Here, one of the ends of each of the cables LA1 to LA3 of the junction cable 2, the end being provided on the earphone-3 side, is an open end. Further, each of the cables LA1 to LA3 is separated from the cable LG assigned as a transmission part by the filter circuit 17, and the other end of each of the cables LA1 to LA3, the other end being provided on the main-body-device-4 side, is connected to the main-body device 4. Since the above-described other end of each of the cables LA1 to LA3 is connected to an antenna-input end of each of the high-band tuner 13H and the low-band tuner 13L via the capacitor 16 and the selection circuit 14, the cables LA1 to LA3 function as a monopole antenna by using the base part of the main-body device 4 as a feeding point. Subsequently, when the cable 19 of the set of earphones 3 is brought into contact with a human body, as shown in FIG. 4, it becomes possible to prevent the part (2) corresponding to the cables LA1 to LA3 from being brought into contact with the human body. The above-described configuration allows for preventing a broadcast wave falling within the band of frequencies received by the cables LA1 to LA3 from being affected by the human body so that the performance of the mobile-phone system 1 increases.

Further, in the mobile-phone system 1, the cables LL, LR, and LG provided on the transmission-part side and the cables LA1 to LA3 provided on the antenna-part side extend in parallel with one another. Therefore, a high-frequency signal induced by the cable 19 of the set of earphones 3, the cable 19 being connected to the junction cable 2 and extended, may enter each of the cables LA1 to LA3 provided on the antenna-part side via the cables LL, LR, and LG provided on the transmission-part side. In such a case, the cable 19 of the set of earphones 3 becomes equivalent to the antenna, and the performance of the mobile-phone system 1 may be deteriorated by the human body.

In the above-described embodiment, however, the value of characteristic impedance of the parallel lines including the antenna part and the transmission part becomes approximately 166 ohms. Therefore, the impedance between the parallel lines becomes significantly higher than that obtained in the case where a coaxial cable with a characteristic impedance of 50 ohms is used, for example. Subsequently, it becomes possible to sufficiently reduce the coupling between the cables LL, LR, and LG provided on the transmission-part side and the cables LA1 to LA3 provided on the antenna-part side. Further, the characteristic impedance of the parallel lines is calculated according to the expression $Z=276/(\epsilon^{1/2})\times\log(d/a)$, where the distance d between the lines is 1.6 [mm] and the conductor radius a is 0.4 [mm]. Here, the sign $\epsilon$ denotes the permittivity between the lines, and the base of the logarithm expressed as log is 10. Subsequently, according to the first embodiment, it becomes possible to suppress the entry of a high-frequency signal to the cables LA1 to LA3 provided on the antenna-part side via the cables LL, LR, and LG provided on the transmission-part side to a practically sufficient level, where the high-frequency signal is induced by the cable of the set of earphones 3. Subsequently, it becomes possible to make only the antenna part of the junction cable 2 function as an antenna, and prevent the performance of the mobile-phone system 1 from being deteriorated by the human body with stability,.

Further, in the above-described embodiment, the length L1 of the junction cable 2 is set to about one-fourth of the length of a specified broadcast wave falling within the frequency band of the high-band tuner 13H. Therefore, in the frequency band of the high-band tuner 13H, a high-frequency signal is induced with efficiency in the antenna part of the junction cable 2 and transmitted to the high-band tuner 13H, which increases the performance of the junction cable 2 functioning as the antenna.

Particularly, in the above-described embodiment, the high-band tuner 13H receives a broadcast wave of the digital-radio broadcast, and the property of the antenna is significantly deteriorated by the human-body contact in the frequency band of the digital-radio broadcast. Therefore, if only the antenna-part side of the junction cable 2 is made to function as an antenna in the frequency band of the high-band tuner 13H, as is the case with the above-described embodiment, the performance of the antenna becomes significantly higher than those of antennas used in the past. Further, even though no high frequency elimination circuit is provided on the earphone-3 side, the mobile-phone system 1 is prevented from being adversely affected by the human body. Subsequently, the mobile-phone system has a more simplified configuration and a higher mechanical strength, and is designed more finely than in the past. Further, it becomes possible to reduce an increase in direct-current resistance occurring in the transmission path used for an audio signal.

Further, the length L2 of from the plug-5 side to the speaker 20L is set to 1200 [mm] which is about one-fourth of the length of the specified broadcast wave falling within the band of frequencies received by the low-band tuner 13L, which means that the length L2 is more than twice as long as the length of the junction cable 2. According to the above-described configuration, the cable 19 of the set of earphones 3 does not function as the antenna in the frequency band of the high-band tuner 13H so that the cable 19 is prevented from being adversely affected by the human-body contact. Subsequently, the cable 19 grows in performance as the antenna.

On the other hand, if the low-band tuner 13L is used to receive a broadcast wave, the mobile-phone system 1 is configured, as below. Namely, on the main-body-device-4 side of the junction cable 2, the cable LG used for the ground line is connected to each of the cables LA1 to LA3 via the filter circuit 17. Since frequencies received by the low-band tuner 13L are lower than those received by the high-band tuner 13H, the impedance of the filter circuit 17 decreases by as much as the difference between the frequencies received by the high-band tuner 13H and those received by low-band tuner 13L. Subsequently, the transmission-part side of the junction cable 2 and the cable 19 connected to the transmission-part side function as a monopole antenna. Therefore, if the reception frequency of the mobile-phone system 1 is low, a broadcast signal can be received by using the monopole antenna with an increased electrical length, which increases the antenna gain and performance of the mobile-phone system 1.

According to the above-described configuration of the first embodiment, the length of both the junction cable 2 and the cable 19 of the set of earphones 3 is set to one-fourth of the length of a broadcast wave received by the low-band tuner 13L. Therefore, it becomes possible to induce a high-frequency signal with efficiency in the transmission-part side of the junction cable 2 and the cable 19, and transmit the high-frequency signal to the low-band tuner 13L, which increases the performance of the mobile-phone system 1.

Further, deterioration of the antenna performance, the deterioration being caused by the human-body contact, is comparatively small in the band of frequencies received by the low-band tuner 13L. In the above-described embodiment, therefore, the band of whole receivable frequencies is divided into the frequency band assigned to the antenna part of the junction cable 2, and the frequency band assigned to the transmission-part side of the junction cable 2 and the cable 19 of the set of earphones 3 based on the significance of effects caused by contact with the human body. Subsequently, the performance of the mobile-phone system 1 in the band of whole receivable frequencies becomes higher than in the past.

Figure 5:
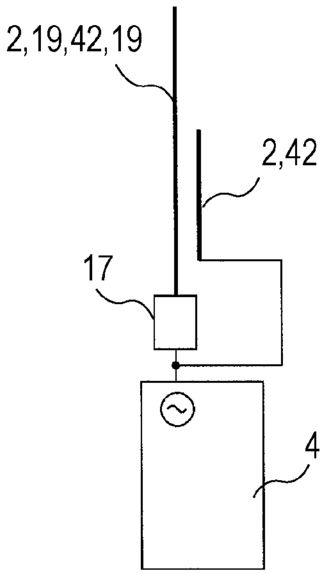
FIG. 5 is an illustration used for describing the junction cable and a set of earphones that are used in the mobile-phone system shown in FIG. 1.
Figure 6:
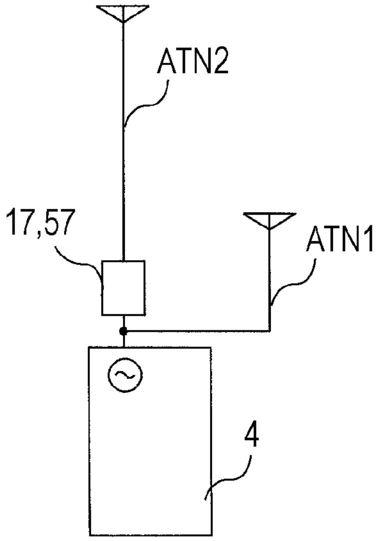
FIG. 6 is a diagram used for describing antennas using the junction cable and the set of earphones that are used in the mobile-phone system shown in FIG. 1.
Figure 7:
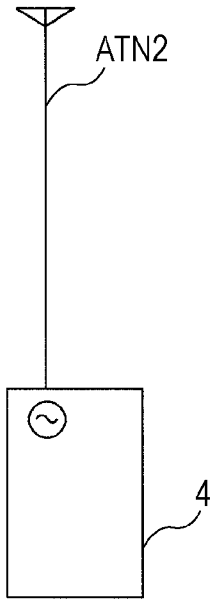
FIG. 7 is a diagram used for describing an antenna configured to receive a low-band frequency signal in the mobile-phone system shown in FIG. 1.
Figure 8:
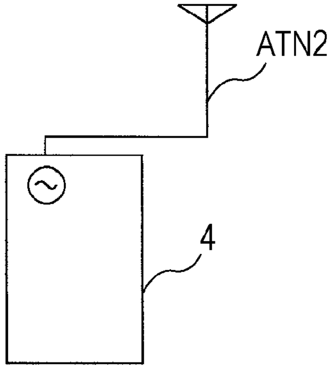
FIG. 8 is a diagram used for describing an antenna configured to receive a high-band frequency signal in the mobile-phone system shown in FIG. 1.

Subsequently, the mobile-phone system 1 includes a first antenna ATN1 used for a high reception frequency, the first antenna ATN1 including the antenna part of the junction cable 2, and a second antenna ATN2 used for a low reception frequency, the second antenna ATN2 including the transmission-part side of the junction cable 2 and the cable 19 of the set of earphones 3, where the first antenna ATN1 and the second antenna ATN2 are parallel to each other and the feeding point thereof is provided at the base part of the main-body device 4, as shown in FIGS. 5 and 6. It becomes possible to receive a desired broadcast wave by switching between the antennas ATN2 and ATN1 through the low-band tuner 13L and the high-band tuner 13H, as shown in FIGS. 7 and 8.

Figures 9, 10, 11, 12:
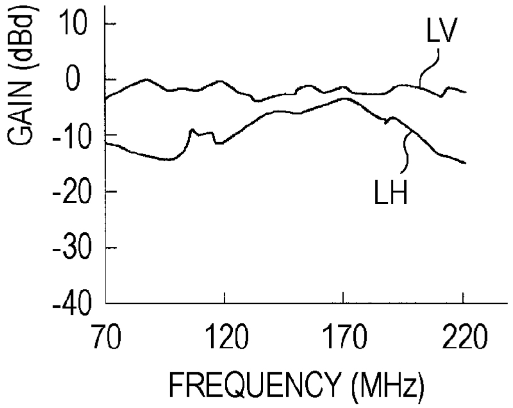
FIG. 9 is a characteristic-curve diagram showing the characteristics of the antenna used in the mobile-phone system shown in FIG. 1.
FIG. 10 is a table showing the characteristics indicated by characteristic curves shown in FIG. 9.
FIG. 11 is a table showing the characteristics of a vertically polarized wave indicated by one of the characteristic curves shown in FIG. 9.
FIG. 12 is a table showing the characteristics of a horizontally polarized wave indicated by the other characteristic curve shown in FIG. 9.

FIG. 9 is a characteristic-curve diagram indicating the antenna gain obtained through the configuration shown in FIG. 1. In FIG. 9, the sign LV shows the result of measurement of a vertically polarized wave and the sign LH shows the result of measurement of a horizontally polarized wave. Further, each of FIGS. 10, 11, and 12 is the table of the measurement result shown in FIG. 9. More specifically, FIG. 10 shows the result of general measurement achieved by selecting one of gains observed during the measurement of the vertically polarized wave and the horizontally polarized wave, where the selected gain is higher than the other. FIG. 11 shows the result of measurement of the vertically polarized wave and FIG. 12 shows the result of measurement of the horizontally polarized wave.

Figures 13, 14, 15, 16:
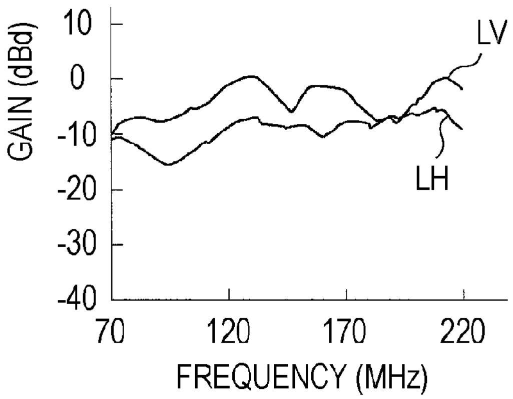
FIG. 13 is a characteristic-curve diagram showing the characteristics observed when the cable of the set of earphones is used as an antenna.
FIG. 14 is a table showing the characteristics indicated by characteristic curves shown in FIG. 13.
FIG. 15 is a table showing the characteristics of a vertically polarized wave indicated by one of the characteristic curves shown in FIG. 13.
FIG. 16 is a table showing the characteristics of a horizontally polarized wave indicated by the other characteristic curve shown in FIG. 13.

FIGS. 13, 14, 15, and 16 are shown in contrast with FIGS. 9 to 12. FIG. 13 is a characteristic-curve diagram indicating the antenna gain obtained by making the cable 19 of the set of earphones 3 function as an antenna. Further, each of FIGS. 14, 15, and 16 is the table of the measurement result shown in FIG. 13. According to the contrast between the FIGS. 9 to 12 and FIGS. 13 to 16, even though the antenna gain shown in FIGS. 13 to 16 sharply decreases near the frequency of 200 [MHz], for example, by being affected by the human body, such a local decrease in the gain is less significant than that in the gain shown in FIGS. 9 to 12 according to the measurement result of the above-described embodiment.

Figure 17:
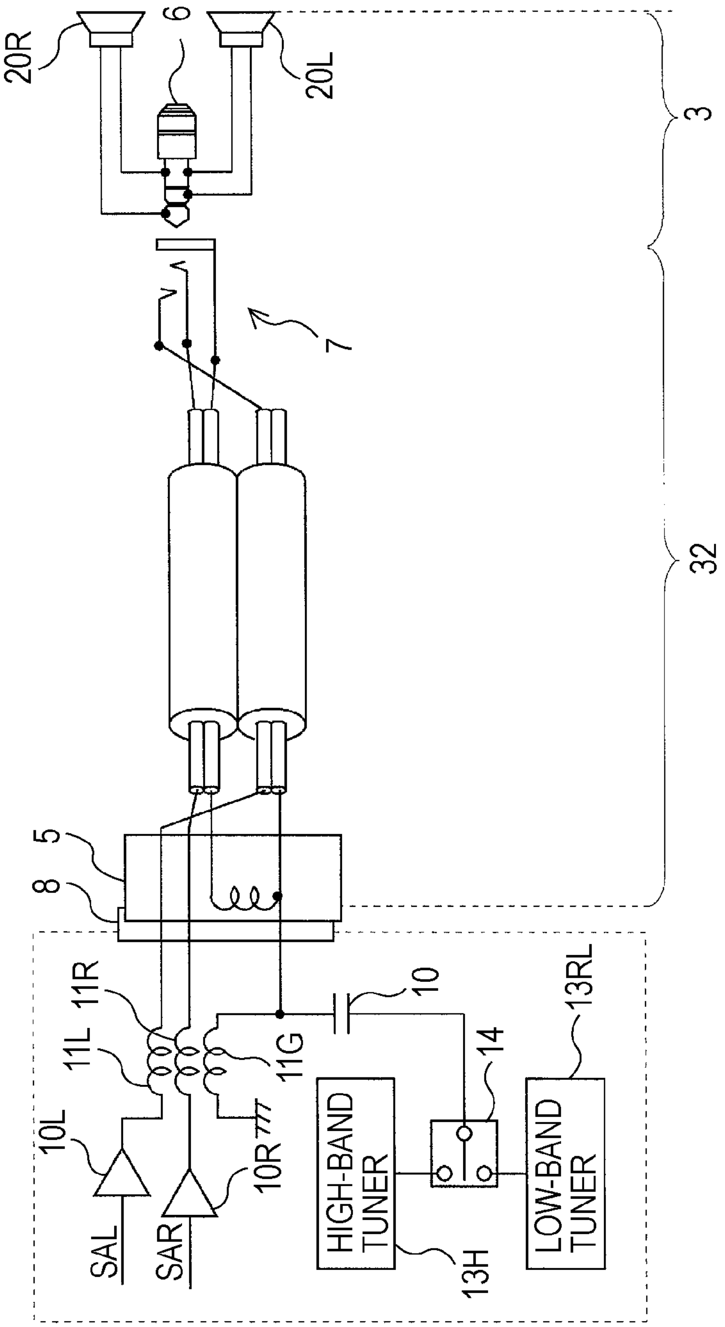
FIG. 17 shows the configuration of an antenna used when the characteristic curves shown in FIG. 13 are measured.

The measurement results shown in FIGS. 13 to 16 are obtained by forming a junction cable 32 by using two parallel Litz wires including two cables, and one of the cables provided on the antenna-part side is used to transmit the audio signal SAL, as indicated by the contrast between FIGS. 1 and 17. In that case, coupling between the cable used to transmit the audio signal SAL and the cable used as the antenna significantly increases so that the cable 19 connected to the cable used to transmit the audio signal SAL functions as the antenna. In that case, the human body affects the mobile-phone system 1 so that the performance of the mobile-phone system 1 is deteriorated.

(3) Advantages of First Embodiment

According to the above-described embodiment, one of the sides of the path used to transmit a high-frequency signal is used as the antenna used for the specified frequency band, where the above-described side corresponds to a predetermined range extending from the main-body device 4, and the other side of the high-frequency-signal transmission path is used to transmit an audio signal, etc. Accordingly, it becomes possible to present an antenna achieved to be mechanically strong, finely designed, and high performance by using a simpler configuration than in the past, and a reception device using the antenna.

Further, since the path used to transmit the high-frequency signal includes the parallel lines, one of the parallel lines is made to function, as the antenna used for the specified frequency band and the other line is used to transmit the audio signal, etc. Subsequently, it becomes possible to present another antenna achieved to be mechanically strong, finely designed, and high performance by using a simpler configuration than in the past, and another reception device including the antenna.

Further, by transmitting an audio signal by using the other of the parallel lines and driving speakers, the configuration of the earphones can be used, as an antenna, which obviates the addition of another antenna so that the design of the reception device is not degraded, for example.

Further, by making the set of earphones detachable by providing the jacks and the plugs, only the junction cable can be used as the antenna during the use of the mobile-phone system, as required.

More specifically, three cables including a cable used to transmit an audio signal of a right channel, a cable used to transmit an audio signal of a left channel, and a cable of a ground line ready for the audio signals of the left and right channels can be provided on one of the sides of parallel lines, and the same number of cables, that is, three cables can be provided on the other side of the parallel lines so that an antenna including parallel Litz wires is formed, where each of the parallel Litz wires includes the three cables, as described above.

Further, since the length of an antenna part formed as one of the parallel lines is set to about one-fourth of the length of a broadcast wave received by a high-band tuner used for the first frequency band, the broadcast wave can be received with efficiency.

Further, one of ends of each of the transmission cables, the end being provided on the main-body-device side is connected to one of ends of the antenna part, the end being provided on the main-body-device side, by using a filter circuit. Subsequently, an antenna used for a low-band tuner can be formed by using the cable of the set of earphones. According to the above-described configuration, an antenna ready for two frequency bands can be provided.

Further, since the length of the antenna part including the cable of the set of earphones is set to about one-fourth of the length of a broadcast wave received by the low-band tuner, a broadcast wave falling within a low-frequency band can be received with efficiency.

Second Embodiment

According to a second embodiment of the present invention, a ground line is specifically designed and provided for each of audio signals of the left and right channels. Therefore, the first and second stranded-wire parts are formed, where each of the stranded-wire parts includes four cables. As for the second stranded-wire part, ends of the four cables thereof are grouped on the main-body-device side and connected to the plug 5. As for the first stranded-wire part, at least one of the ground lines specifically designed for the audio signals is connected to the cables of the second stranded-wire part.

Although the specifically designed ground line is provided for each of the right and left channels, as in the second embodiment, the same effects as those of the first embodiment can be obtained.

Third Embodiment

Figure 18:
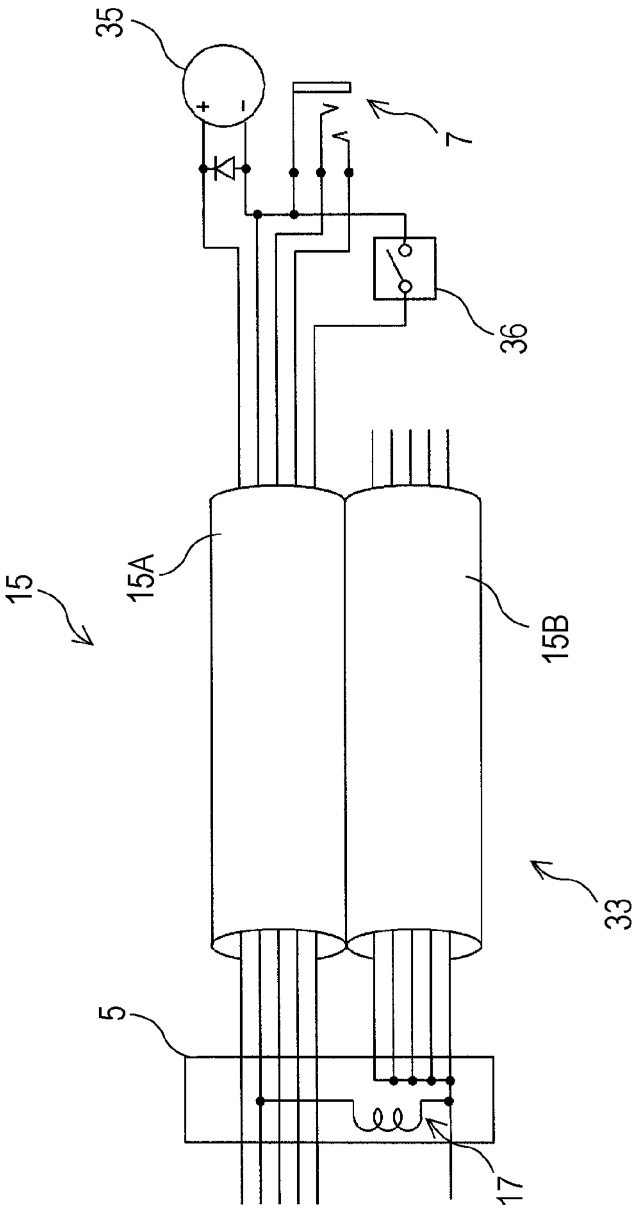
FIG. 18 is a schematic diagram showing a junction cable according to another embodiment of the present invention.

FIG. 18 is a schematic diagram showing a junction cable 33 used in a third embodiment of the present invention. The junction cable 33 and a set of earphones connected to the jack 7 form a headset. Further, on one of ends of the junction cable 33, the end being provided on the jack-7 side, a microphone 35 and a switch circuit 36 used to remotely control a main-body device are provided. For supporting the above-described configuration, each of the first and second stranded-wire parts 15A and 15B includes five cables. In the junction cable 33, ends of the five cables of the second stranded-wire part 15B, the ends being provided on the main-body-device side, are grouped and connected to the plug 5. Further, in the first stranded-wire part 15A, the ground line is connected to the cable of the second stranded-wire part 15B.

If a microphone, a switch circuit, etc. are provided, as in the above-described embodiment, the same effects as those of the first embodiment can be obtained.

Fourth Embodiment

Figure 19:
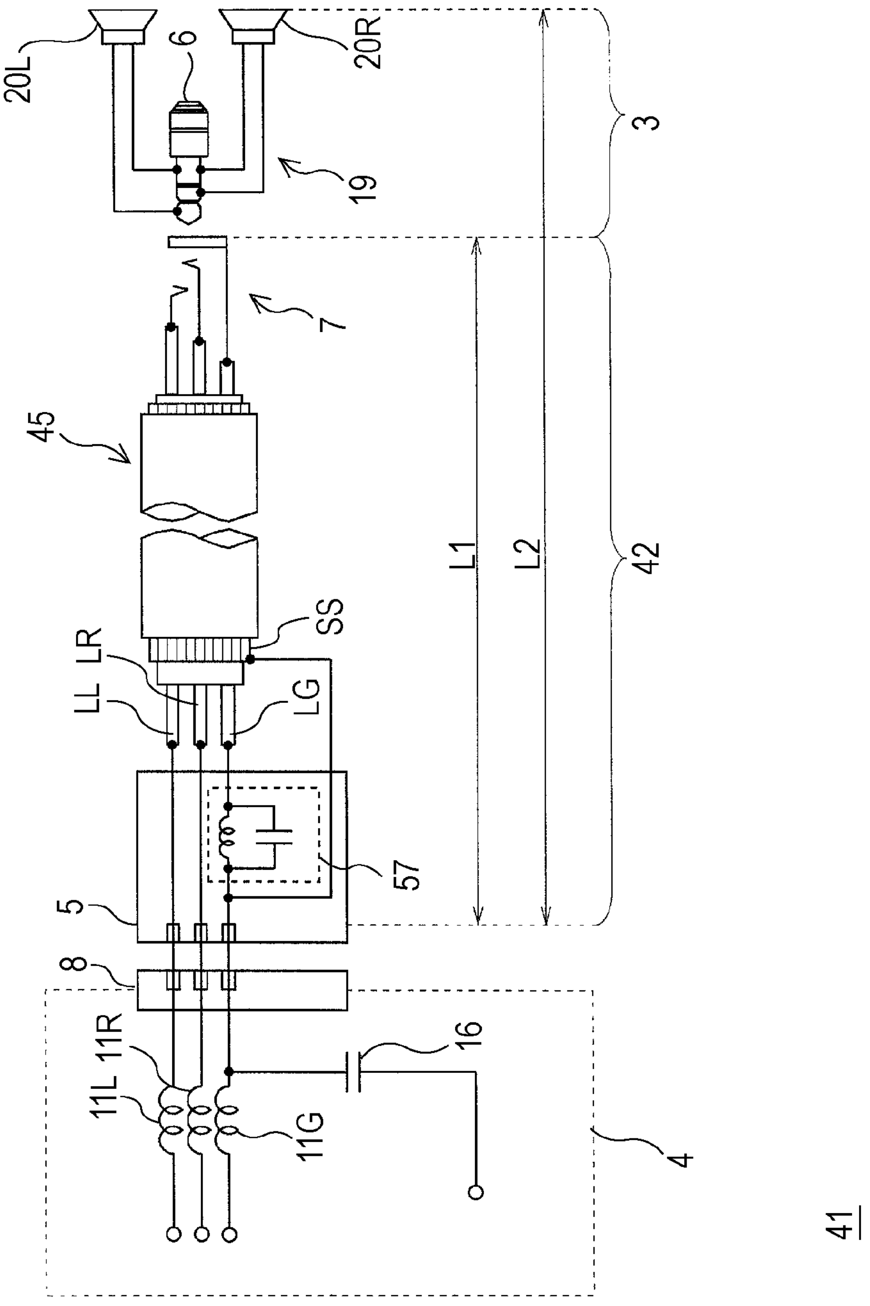
FIG. 19 is a block diagram showing a mobile-phone system according to another embodiment of the present invention.

FIG. 19 is a block diagram showing a mobile-phone system 41 according to a fourth embodiment of the present invention. In the mobile-phone system 41, the same components as those of the mobile-phone system 1 shown in 1 are designated by the same reference numerals and the descriptions thereof are omitted.

The mobile-phone system 41 has the same configuration as that of the mobile-phone system 1 of the first embodiment except that a junction cable 42 is provided in place of the junction cable 2. The junction cable 42 includes a multi-conductor coaxial cable 45 provided in place of the parallel Litz wires 15 so that the junction cable 42 has the same configuration as that of the junction cable 2 except for the configuration relating to the multi-conductor coaxial cable 45. Subsequently, the junction cable 42 includes a coaxial-transmission path used to transmit a high-frequency signal, that is, the multi-conductor coaxial cable 45.

Figure 20:
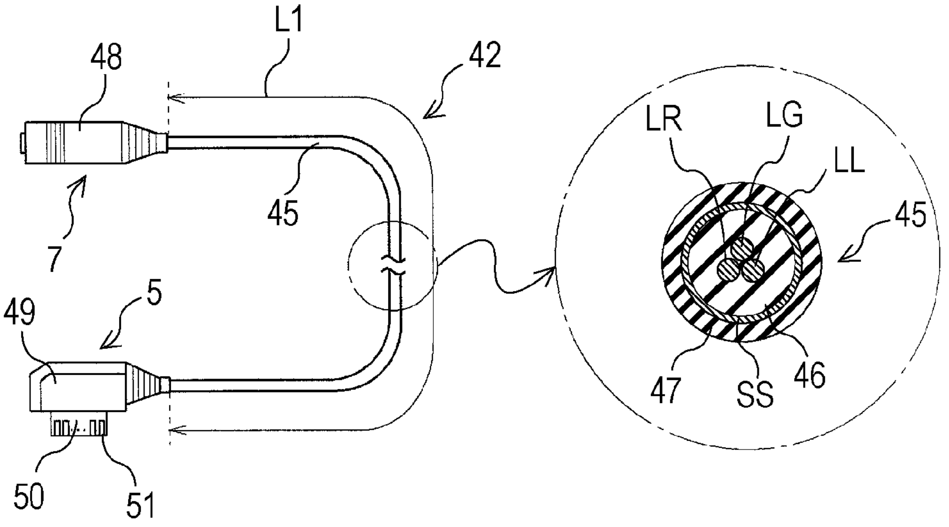
FIG. 20 shows a plan view and a sectional view of a junction cable provided in the mobile-phone system shown in FIG. 19.

FIG. 20 is a sectional view of the multi-conductor coaxial cable 45. In FIG. 20, a plurality of core-wire cables LL, LR, and LG is provided at almost the center of the multi-conductor coaxial cable 45, and the core-wire cables LL, LR, and LG are surrounded by a coating rod SS, which is a mesh-wire rod. According to the above-described multi-conductor coaxial cable 45, an insulation sheath 46 is provided between the core-wire cables LL, LR, and LG, and the coating rod SS, and the coating rod SS is covered by an insulation covering 47.

In the multi-conductor coaxial cable 45, the core-wire cables LL, LR, and LG are assigned as a transmission part and the coating rod SS is assigned as an antenna part. Subsequently, in the multi-conductor coaxial cable 45, the number of the core-wire cables is determined to be three, the core-wire cable LL is assigned as a path used to transmit the audio signal SAL, and the core-wire cable LR is assigned as a path used to transmit the audio signal SAR. The core-wire cable LL is connected to a terminal of the plug 5 and a terminal of the jack 7, the terminals corresponding to the core-wire cable LL, and the core-wire cable LR is connected to another terminal of plug 5 and another terminal of the jack 7, the terminals corresponding to the core-wire cable LR. Further, the core-wire cable LG is assigned as a ground line used for the audio signals SAL and SAR, and one of the ends of the core-wire cable LG is connected to another terminal of the jack 7, the terminal corresponding to the core-wire cable LG, and the other end of the core-wire cable LG is connected to another terminal of the plug 5 via a filter circuit 57, the terminal corresponding to the core-wire cable LG. In FIG. 20, a cylindrical-insulation sleeve 48 includes a resin molding the jack 7. Further, an insulation case 49 includes a resin molding the plug 5, a projecting part 50 is inserted into a jack 8 of the main-body device 4, and an electrode 51 is provided on the projecting part 50.

Figure 21:
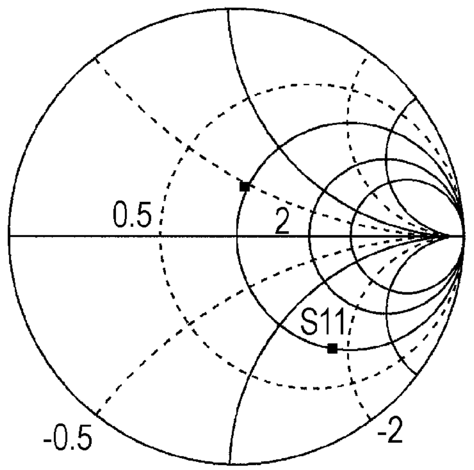
FIG. 21 is a characteristic-curve diagram used for describing a filter circuit provided in the mobile-phone system shown in FIG. 19.
Figure 22:
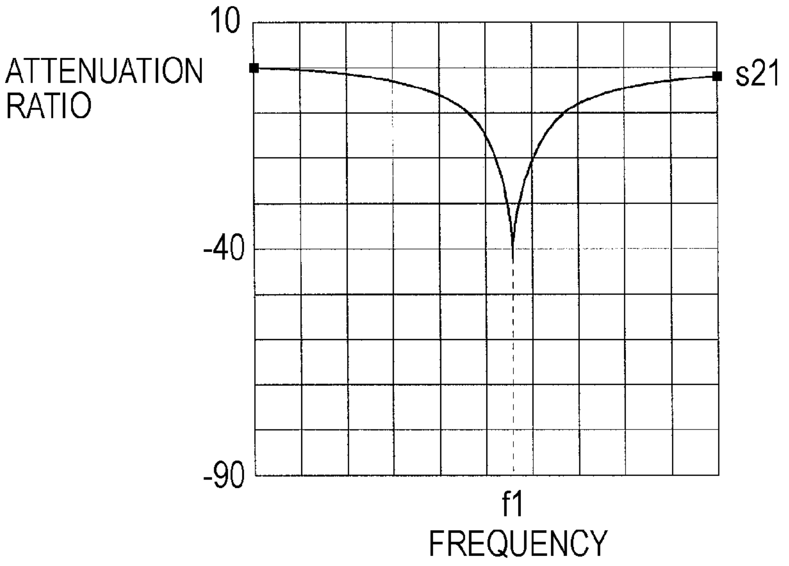
FIG. 22 is a characteristic-curve diagram showing an attenuation ratio obtained by the filter circuit provided in the mobile-phone system shown in FIG. 19.

Here, the filter circuit 57 is a band-elimination filter having a sufficiently high impedance in the band of frequencies received by the high-band tuner 13H shown in FIG. 1, and a sufficiently low impedance in the band of frequencies received by the low-band tuner 13L and that of frequencies of the audio signals SAL and SAR. In the fourth embodiment, the filter circuit 57 includes a parallel-resonance circuit having a capacitor and an inductor. The parallel frequency of the parallel-resonance circuit is determined, so as to fall within the band of frequencies received by the high-band tuner 13H. Further, sharpness Q is determined, so as to ensure a sufficient attenuation ratio in the band of frequencies received by the high-band tuner 13H. More specifically, in the filter circuit 57 of the fourth embodiment, the capacitance of the capacitor is determined to be 10 [pF] and the inductance of the inductor is determined to be 68 [nH]. According to FIG. 21 showing a smith chart indicating a characteristic S11, and FIG. 22 showing a graph indicating the attenuation characteristics, the impedance of the filter circuit 57 becomes almost infinite at the part corresponding to a frequency f1 (192 [MHz]) shown at almost the center of the band of frequencies received by the high-band tuner 13H, which sufficiently prevents the entry of a high-frequency signal transmitted through the core-wire cable LG in practice.

One of the ends of the coating rod SS of the junction cable 42, the end provided on the earphone-3 side, is an open end. Further, on the plug-5-side of the junction cable 42, the coating rod SS is connected to one of the ends of the filter circuit 57, the end being provided on the plug-5 side. Further, the length L1 of the coating rod SS is determined so that the coating rod SS functions as a monopole antenna in the band of frequencies received by the high-band tuner 13H. More specifically, in the fourth embodiment, the length L1 is set to 430 [mm] which is one-fourth of the length of a predetermined frequency received by the high-band tuner 13H.

Figure 23:
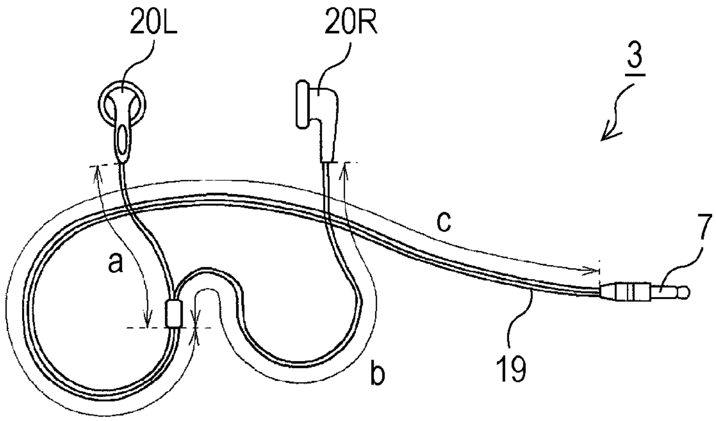
FIG. 23 is a plan view of a set of earphones used in the mobile-phone system shown in FIG. 19.

Subsequently, in the fourth embodiment, the length L2 of from the plug 5 to each of the speakers 20L and 20R is set to about one-fourth of the length of a predetermined broadcast wave falling within the band of frequencies received by the low-band tuner 13L, as in the first embodiment. FIG. 23 illustrates the set of earphones 3. Namely, parallel two-wire cables extending from each of the speaker 20L used for the left channel and the speaker 20R used for the right channel are connected to a three-wire flat cable including a ground line that can be shared by audio signals assigned to the left and right channels. The three wires of the flat cable are connected to terminals of the jack 7. According to the set of earphones 3, the length a of the parallel-two-wire cable extending from the speaker 20L used for the left channel is set to 140 [mm], the length b of the parallel-two-wire cable extending from the speaker 20R used for the right channel is set to 450 [mm], and the length c of the three-wire flat cable is set to 1050 [mm].

Figure 24:
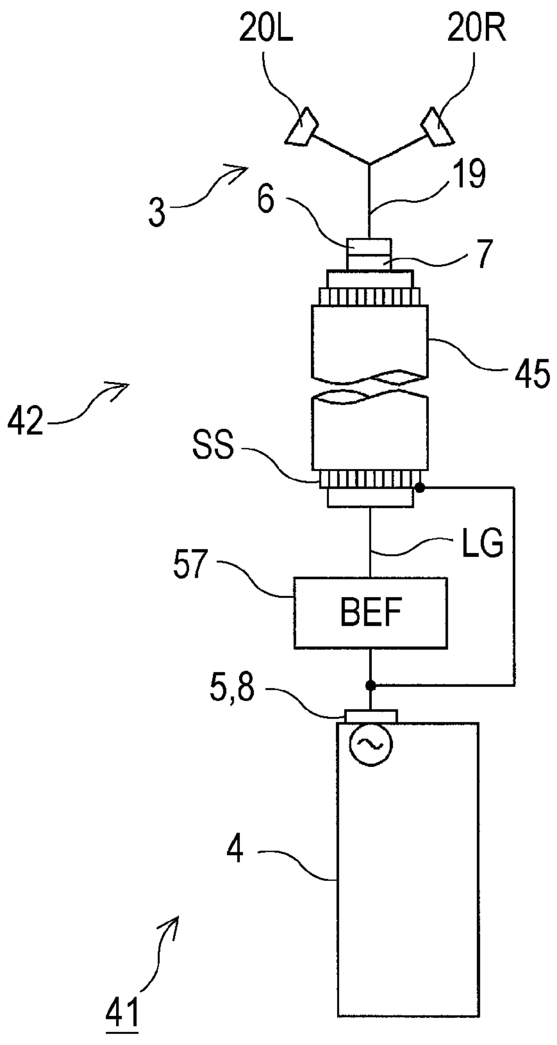
FIG. 24 is a schematic diagram used for describing operations of the mobile-phone system shown in FIG. 19.

Subsequently, in the fourth embodiment, the cable 19 of the set of earphones 3 is connected to an antenna-input terminal of the jack 8 provided in the main-body device 4 via the core-wire cable LG of the junction cable 42 and the filter circuit (BEF) 57, and the coating rod SS of the junction cable 42 is connected to the antenna-input terminal, as shown in FIG. 24. Subsequently, in the fourth embodiment, the antenna ATN2 of the low-band tuner 13L, the antenna ATN2 including the cable 19 of the set of earphones 3 and the core-wire cable LG of the junction cable 42, is connected to the antenna-input terminal via the filter circuit 57, and the antenna ATN1 of the high-band tuner 13H, the antenna ATN1 including the coating rod SS of the junction cable 42, is connected to the antenna-input terminal, as indicated by bracketed reference numerals shown in FIG. 6.

As a result, it becomes possible to receive a broadcast wave by using the low-band tuner 13L in almost the same state as that where a monopole antenna designed for the low-band tuner 13L is connected, as shown in FIG. 7. Further, it becomes possible to receive a broadcast wave by using the high-band tuner 13H in almost the same state as that where a monopole antenna designed for the high-band tuner 13H is connected, as shown in FIG. 8.

Further, when receiving a broadcast signal by using the high-band tuner 13H, it becomes possible to receive a broadcast signal by using the junction cable 42 provided at a predetermined distance from the human body, as indicated by bracketed reference numeral 42 shown in FIG. 4. Subsequently, the mobile-phone system is prevented from being affected by the human body.

Figure 25:
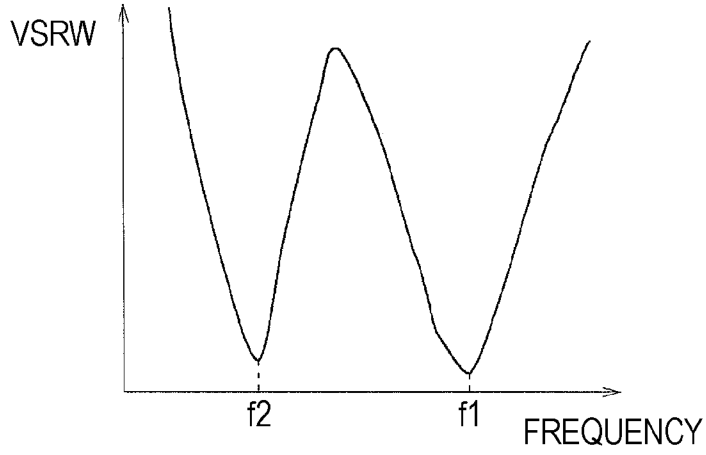
FIG. 25 is a characteristic-curve diagram showing the standing-wave rate obtained by using the mobile-phone system shown in FIG. 19.

FIG. 25 is a characteristic-curve diagram showing the standing-wave rate measured at the antenna-input terminal of the jack 8. A frequency f2 is a frequency observed at almost the center of the band of frequencies received by the low-band tuner 13L. According to FIG. 25, the mobile-phone system 41 of the fourth embodiment can suppress the standing-wave rate to a sufficient level in a desired frequency band.

Figures 26, 27, 28, 29:
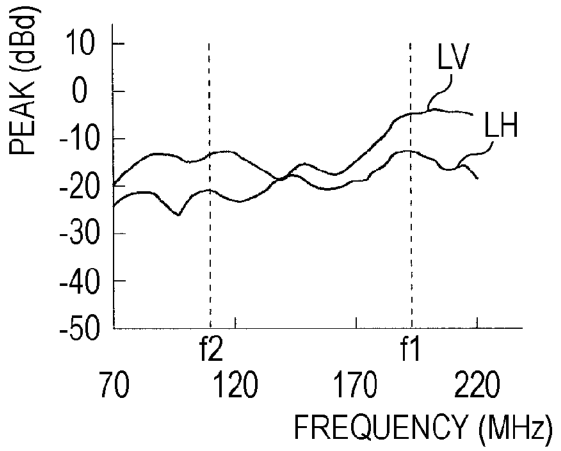
FIG. 26 is a characteristic-curve diagram showing the antenna characteristics observed in the mobile-phone system shown in FIG. 19.
FIG. 27 is a table showing the characteristics indicated by characteristic curves shown in FIG. 26.
FIG. 28 is a table showing the characteristics of a vertically polarized wave indicated by one of the characteristic curves shown in FIG. 26.
FIG. 29 is a table showing the characteristics of a horizontally polarized wave indicated by the other characteristic curve shown in FIG. 26.
Figures 30, 31, 32, 33:
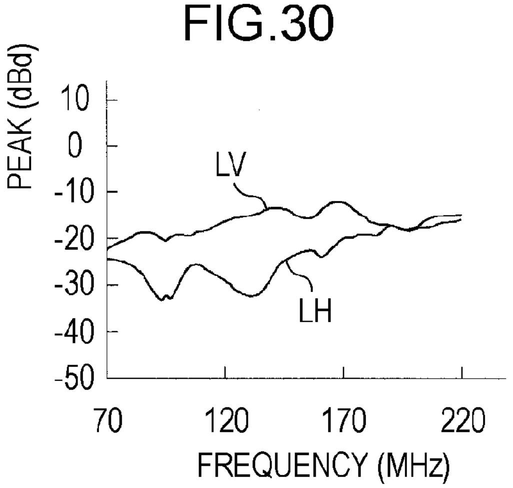
FIG. 30 is a characteristic-curve diagram showing characteristics observed when the cable of the set of earphones is used as an antenna.
FIG. 31 is a table showing the characteristics indicated by characteristic curves shown in FIG. 30.
FIG. 32 is a table showing the characteristics of a vertically polarized wave indicated by one of the characteristic curves shown in FIG. 30.
FIG. 33 is a table showing the characteristics of a horizontally polarized wave indicated by the other characteristic curve shown in FIG. 30.

By being compared to FIG. 9, FIG. 26 shows the reception sensitivity of the mobile-phone system 41 of the fourth embodiment. Being compared to FIGS. 10, 11, and 12, each of tables shown FIGS. 27, 28, and 29 shows the details on the result of measurement illustrated in FIG. 26. On the other hand, being compared to FIGS. 26, 27, 28, and 29, each of a graph shown in FIG. 30 and tables shown in FIGS. 31, 32, and 33 indicates the details on the result of measurement performed by omitting the junction cable 42 and using the cable 19 including the parallel-Litz wires of the set of earphones 3, as the antenna. Namely, FIGS. 26 to 33 shows that, in the fourth embodiment, the coating rod SS of the junction cable 42 functions as an antenna used only for the high-band tuner 13H so that the sensitivity of the mobile-phone system 41 increases by as much as about 10 [dB] in the band of frequencies received by the high-band tuner 13H.

According to the configuration of the fourth embodiment, one of the sides of the path used to transmit a high-frequency signal is used as the antenna used for the predetermined frequency band, where the above-described side corresponds to a predetermined range extending from the main-body device, and the other side of the high-frequency-signal transmission path is used to transmit an audio signal, etc. Although the high-frequency-signal transmission path is formed as a coaxial-transmission path including the core-wire cables and the coating rod, the same effects as those of the first embodiment can be obtained.

Further, since the speakers are driven by transmitting the audio signal through the core-wire cable, the configuration of the set of earphones can be used as an antenna, which obviates the addition of another antenna so that the design of the mobile-phone system is not degraded, for example.

Further, by making the set of earphones detachable by providing the jacks and the plugs, only the junction cable can be used as the antenna during the use of the mobile-phone system, as required.

More specifically, the three core-wire cables including the cable used to transmit an audio signal of the right channel, the cable used to transmit an audio signal of the left channel, and the cable used as the ground line ready for the audio signals of the left and right channels are provided. Subsequently, it becomes possible to form an antenna by using a multi-conductor coaxial cable including three core wires.

Further, the length of the antenna part including the coating rod is set to about one-fourth of the length of a broadcast wave received by the high-band tuner corresponding to the first frequency band, which allows for receiving the broadcast wave with efficiency.

Further, one of ends of each of the transmission cables, the end being provided on the main-body-device side, is connected to one of ends of the antenna part, the end being provided on the main-body-device side, by using the filter circuit. Subsequently, the antenna used for the low-band tuner can be formed by using the cable of the set of earphones. According to the above-described configuration, the antenna ready for two frequency bands can be provided.

Further, since the length of the antenna part including the cable of the set of earphones is set to about one-fourth of the length of a broadcast wave received by the low-band tuner, a broadcast wave falling within a low-frequency band can be received with efficiency.

Fifth Embodiment

Figure 34:
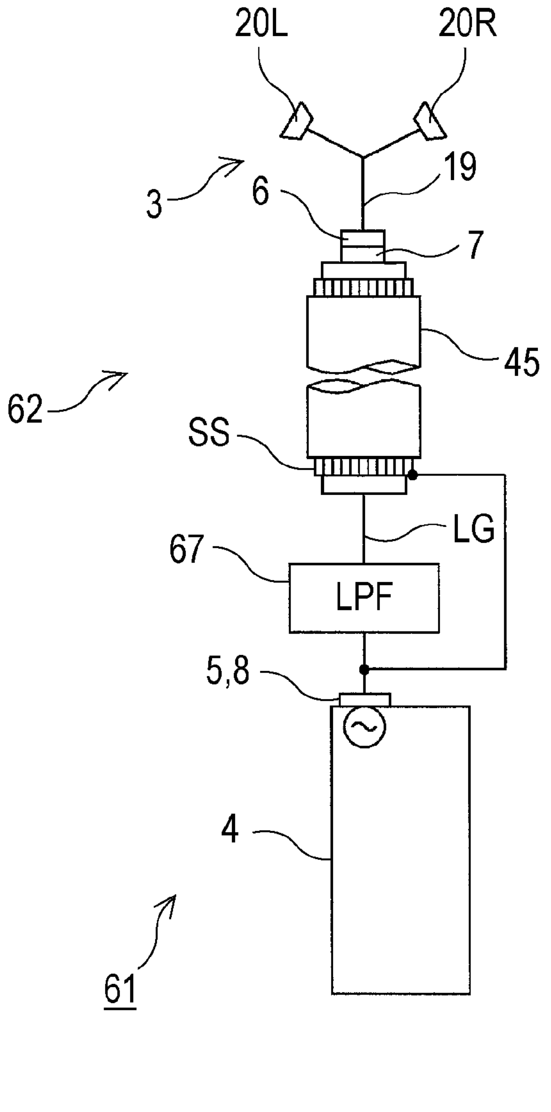
FIG. 34 is a diagrammatic illustration used for describing a mobile-phone system according to another embodiment of the present invention.

By being compared to FIG. 24, FIG. 34 is a diagrammatic illustration of a mobile-phone system 61 according to a fifth embodiment of the present invention. The mobile-phone system 61 has the same configuration as that of the mobile-phone system 41 of the fourth embodiment except that a junction cable 62 is used in place of the junction cable 42. Further, the junction cable 62 has the same configuration as that of the junction cable 42 except that a low-pass filter (LPF) 67 is provided in place of the filter circuit 57 including the band-elimination filter.

The same effects as those of the fourth embodiment can be obtained by using the LPF 67 for the filter circuit, as in the fourth embodiment.

Sixth Embodiment

Figure 35:
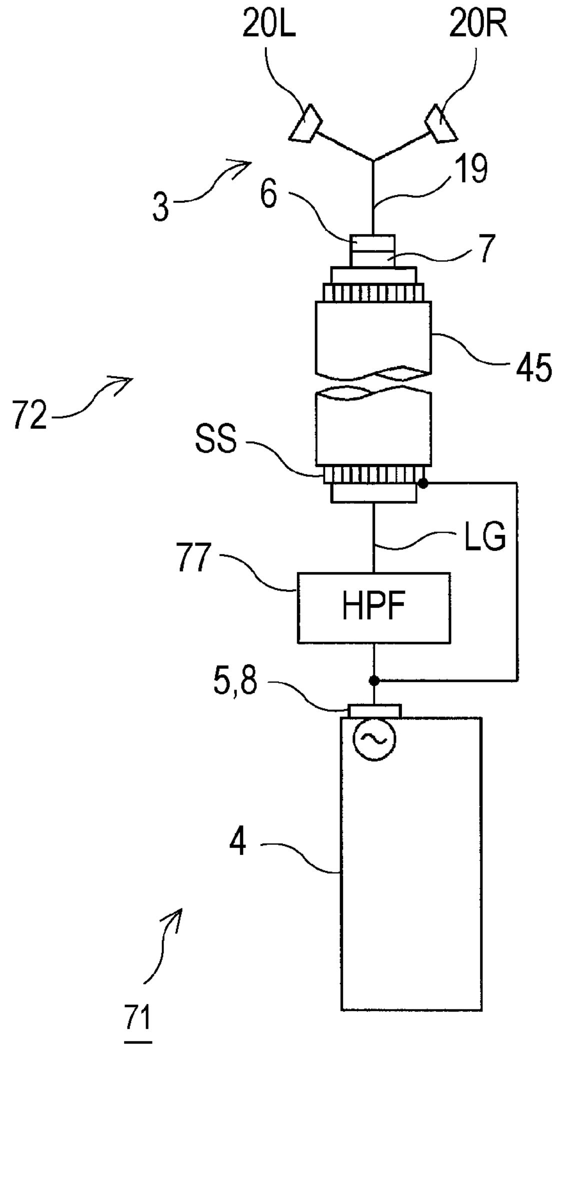
FIG. 35 is a diagrammatic illustration used for describing a mobile-phone system according to another embodiment of the present invention.
Figure 36:
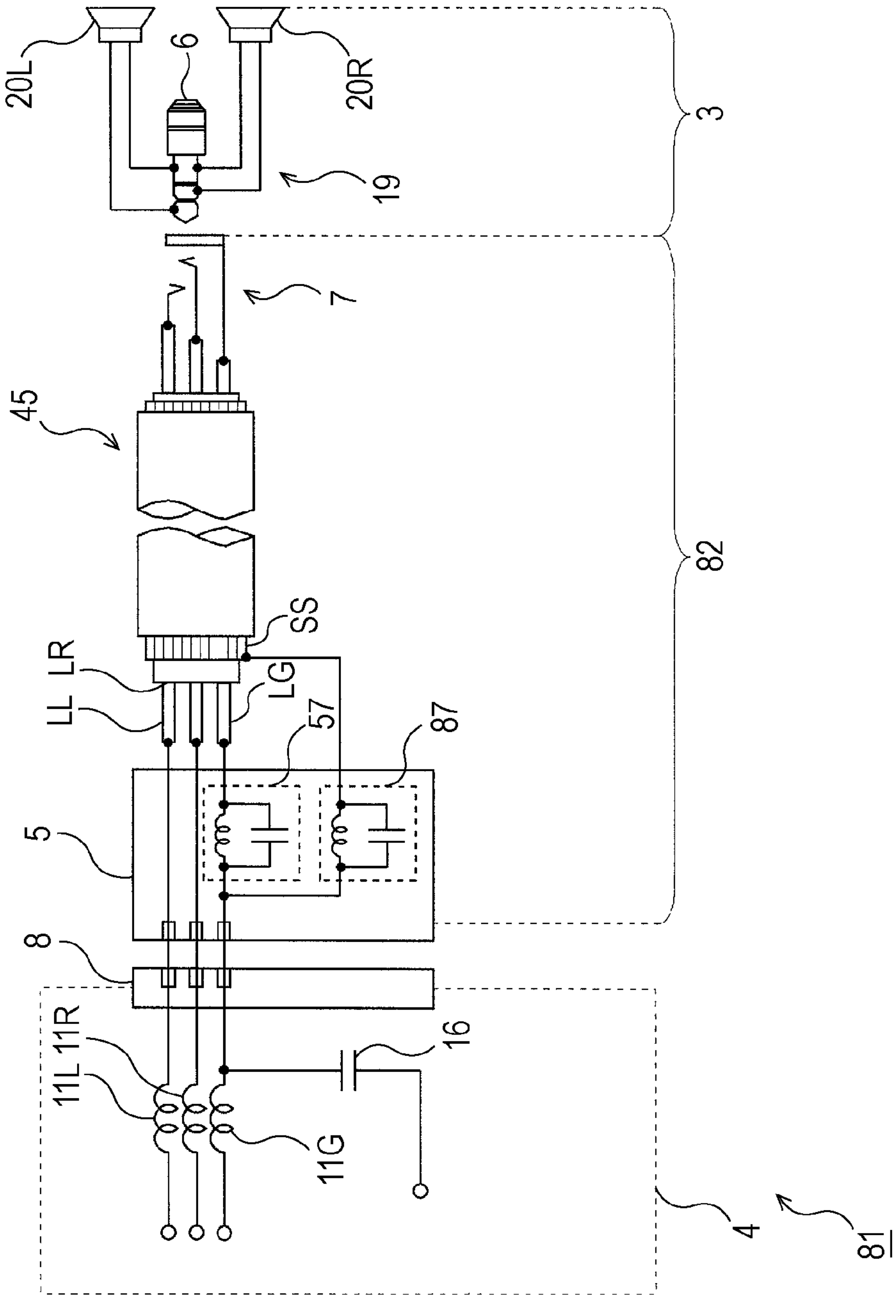
FIG. 36 is a connection diagram showing a mobile-phone system according to another embodiment of the present invention.
Figure 37:
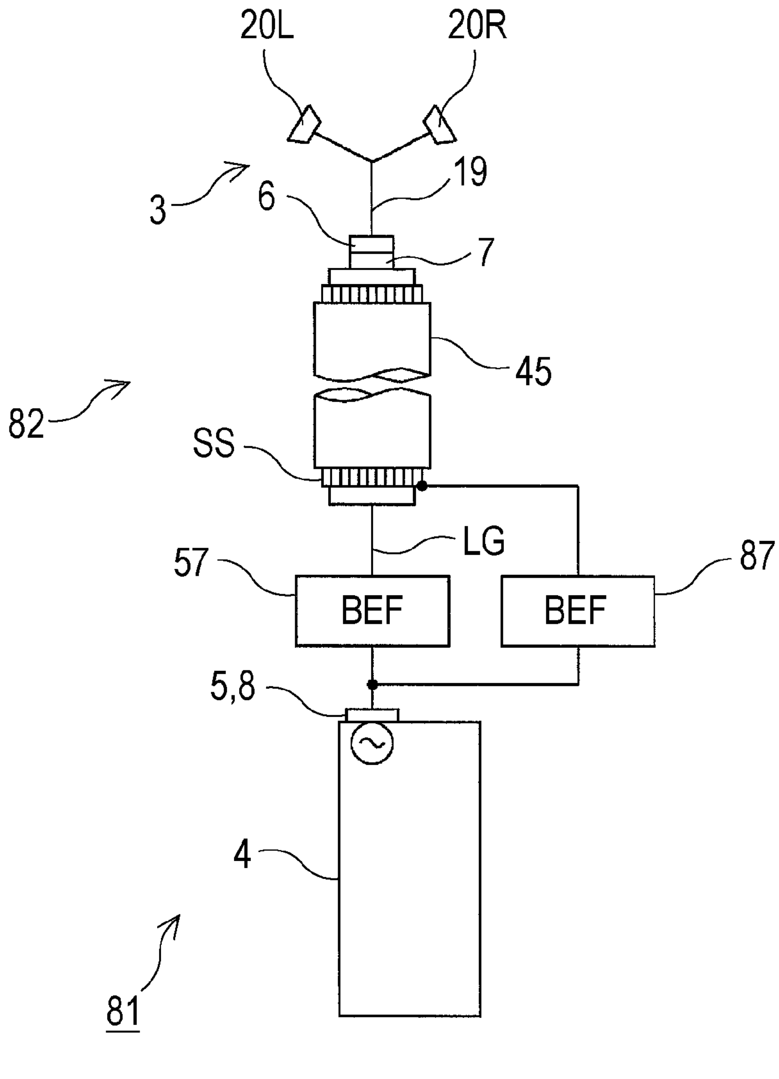
FIG. 37 is a diagrammatic illustration used for describing the mobile-phone system shown in FIG. 36.

By being compared to FIG. 34, FIG. 35 is a diagrammatic illustration of a mobile-phone system 71 according to a sixth embodiment of the present invention. The mobile-phone system 71 has the same configuration as that of the mobile-phone system 41 of the fourth embodiment except that a junction cable 72 is used in place of the junction cable 42.

In the above-described mobile-phone system 71, the coating rod SS is made to function as the antenna of the low-band tuner 13L due to the determination of the length of the junction cable 72, and the core-wire cable LG and the cable 19 are made to function as the high-band tuner 13H. More specifically, the length L1 of the coating rod SS is determined to be one-fourth of the length of the wavelength λ1 corresponding to a reception frequency f1 of the low-band tuner 13L so that the coating rod SS functions as the antenna of the low-band tuner 13L. Further, the length of the core-wire cable LG and the cable 19 is determined to be three-fourth of the wavelength λ2 corresponding to a reception frequency f2 of the high-band tuner 13H so that the core-wire cable LG and the cable 19 are made to function as the high-band tuner 13H.

For supporting the above-described configuration, a filter circuit 77 including a high-pass filter (HPF) is provided in place of the filter circuit 57 including the band-elimination filter. Settings on the filter circuit 77 are made so that the impedance thereof becomes sufficiently low in the band of frequencies of the audio signals SAL and SAR. The mobile-phone system 71 has the same configuration as that of the mobile-phone system 61 of the fifth embodiment except the above-described configuration.

Although the assignments of the antennas are changed and the high-pass filter is used as the filter circuit, as in the sixth embodiment, the same effects as those of the above-described embodiments can be obtained.

Particularly, the sixth embodiment is configured so that only the coating rod SS provided at a predetermined distance from the human body is made to function as the antenna in the reception-frequency band on the low-band-tuner side. Therefore, the reception frequencies of the high-band tuner and the low-band tuner are different from those of the first embodiment so that when the human body produces a large effect in the reception-frequency band of the low-band tuner, the human-body effect produced on the low-band tuner can be significantly reduced.

Seventh Embodiment

By being compared to FIGS. 19 and 35, FIGS. 36 and 37 respectively show a mobile-phone system 81 according to a seventh embodiment of the present invention. The above-described mobile-phone system 81 has the same configuration as that of the mobile-phone system 41 of the fourth embodiment except that a junction cable 82 is used in place of the junction cable 42. Further, the junction cable 82 has the same configuration as that of the junction cable 42 of the fourth embodiment except that the coating rod SS is connected to the plug 5 via a filter circuit 87 including a band-elimination filter (BEF) which selectively eliminates a frequency band assigned to the core-wire cable.

Figure 38:
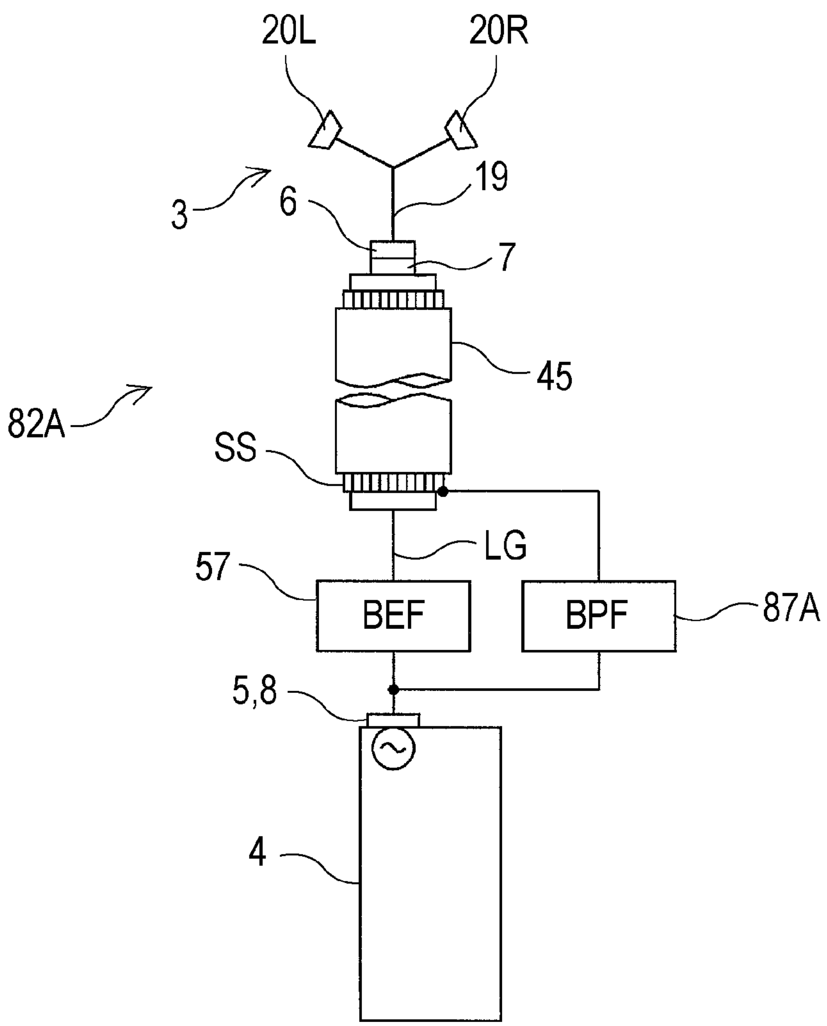
FIG. 38 is a diagrammatic illustration used for describing another example of the mobile-phone system shown in FIG. 36.
Figure 39:
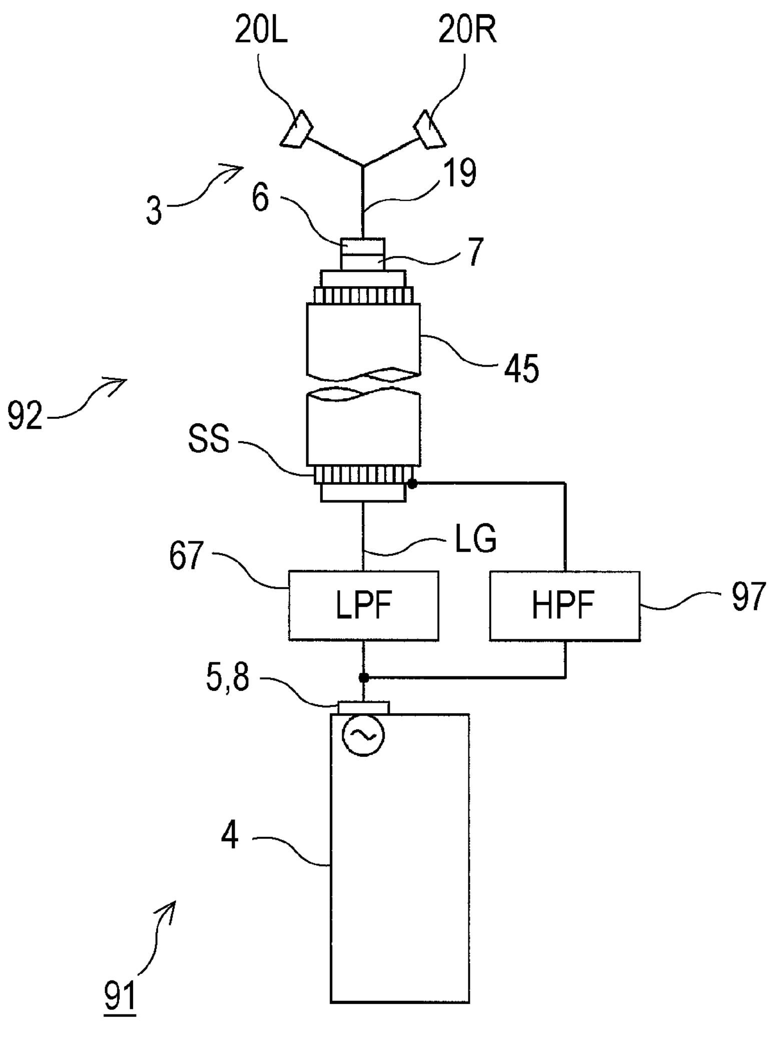
FIG. 39 is a diagrammatic illustration used for describing a mobile-phone system according to another embodiment of the present invention.
Figure 40:
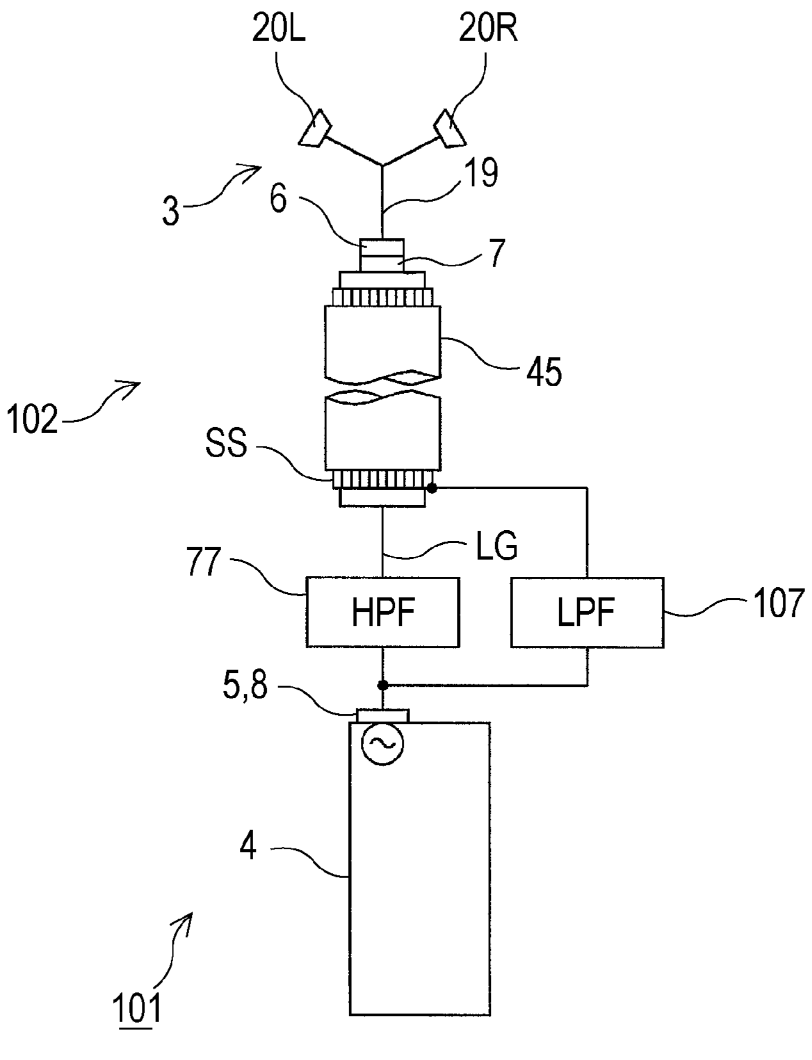
FIG. 40 is a diagrammatic illustration used for describing another example of the mobile-phone system shown in FIG. 39.

Further, as shown in FIG. 38, a filter circuit 87A including a band-pass filter (BPF) which selectively passes a signal falling within a frequency band assigned to the coating rod SS may be provided in place of the above-described filter circuit 87.

Although another filter circuit is provided on the antenna-part side, which is the coating-rod side, as in the seventh embodiment, the same effects as those of the above-described embodiments can be obtained. Further, in the seventh embodiment, only the coating rod SS can be made to function as the antenna of the high-band tuner, which increases the performance of the mobile-phone system 81.

Eighth Embodiment

By being compared to FIGS. 34 and 35, FIGS. 39 and 40 respectively show a mobile-phone systems 91 and 101 according to an eighth embodiment of the present invention. The above-described mobile-phone system 91 has the same configuration as that of the mobile-phone system 61 except that a junction cable 92 is used in place of the junction cable 62, and the above-described mobile-phone system 101 has the same configuration as that of the mobile-phone system 71 except that a junction cable 102 is used in place of the junction cable 72. Further, the junction cable 92 has the same configuration as that of the junction cable 62 except that the coating rod SS is connected to the plug 5 via a filter circuit 97 including a high-pass filter (HPF) which passes a signal falling within a frequency band assigned to the coating rod SS. Still further, the junction cable 102 has the same configuration as that of the junction cable 72 except that the coating rod SS is connected to the plug 5 via a filter circuit 107 including a low-pass filter (LPF) which passes a signal falling within a frequency band assigned to the coating rod SS.

Thus, according to the eighth embodiment, another filter circuit is provided on the antenna-part side, which is the coating-rod side, in the configuration of each of fifth and sixth embodiments. However, the same effects as those of the corresponding embodiments can be obtained.

Ninth Embodiment

Figure 41:
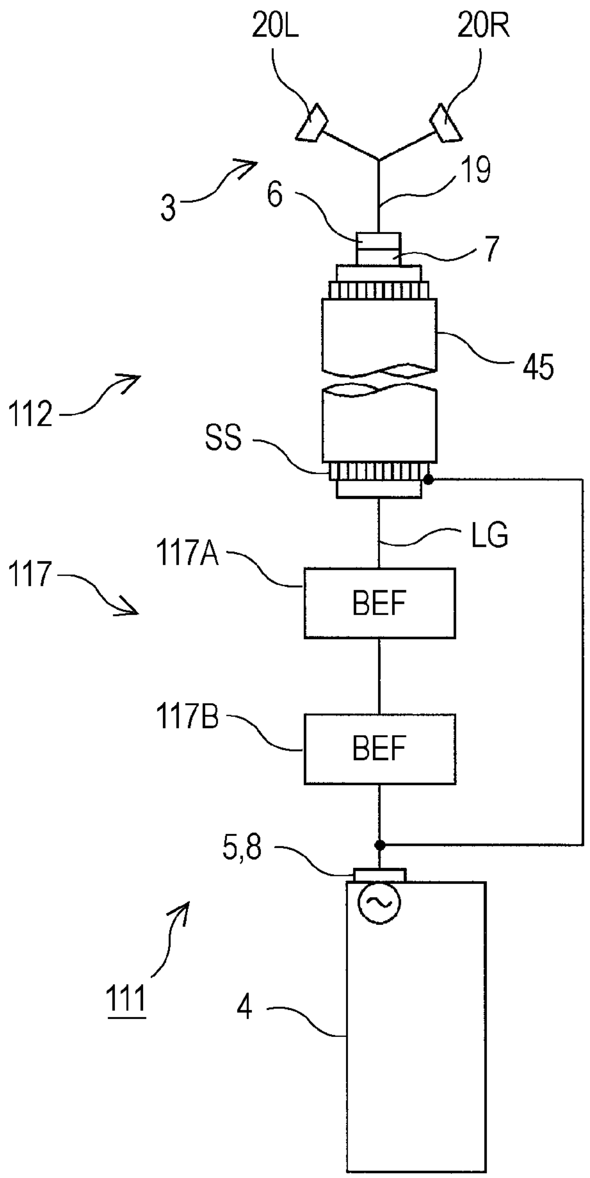
FIG. 41 is a diagrammatic illustration used for describing a mobile-phone system according to another embodiment of the present invention.
Figure 42:
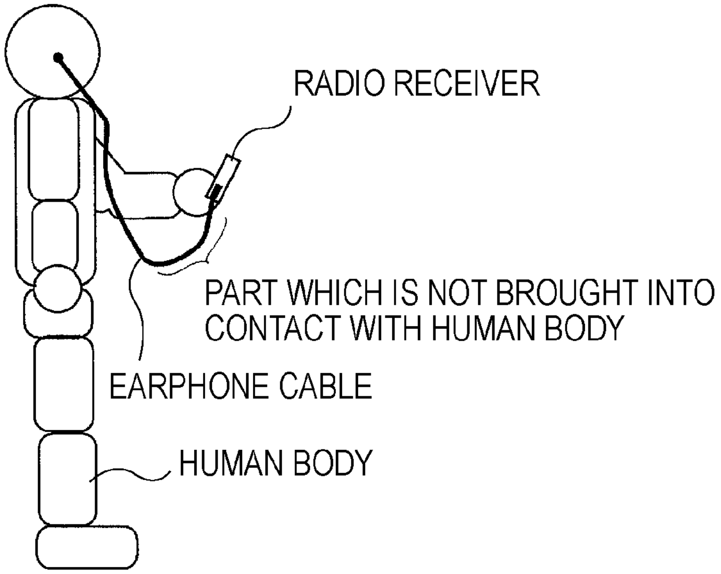
FIG. 42 is a schematic diagram used for describing an effect produced by a human body.

By being compared to FIG. 24, FIG. 41 is a diagrammatic illustration of a mobile-phone system 111 according to a ninth embodiment of the present invention. The above-described mobile-phone system 111 has the same configuration as that of the mobile-phone system 41 of the fourth embodiment except that a junction cable 112 is used in place of the junction cable 42. Further, the junction cable 112 has the same configuration as that of the junction cable 42 except that a filter circuit 117 is used in place of the filter circuit 57, where the filter circuit 117 is provided as a staggering circuit including a direct circuit having two band-elimination filters (BEF) 117A and 117B. The resonance frequencies of the two band-elimination filters 117A and 117B are different from each other.

Although the filter circuit 177 is provided as the staggering circuit, as in the ninth embodiment, the same effects as those of the above-described embodiments can be obtained. Further, according to the above-described configuration, only the coating rod SS functions as the antenna of the high-band tuner in a wide frequency band assigned to the coating rod, which increases the performance of the mobile-phone system 111.

Tenth Embodiment

According to each of the above-described embodiments, the set of earphones 3 is connected to the junction cable in a detachable manner by using the plug and the jack. However, according to a tenth embodiment of the present invention, the set of earphones and the junction cable may be integrated with each other, as required, without being limited to the above-described configuration.

According to each of the above-described embodiments, the junction cable is connected to the main-body device in a detachable manner. However, without being limited to the above-described configuration, the junction cable may be provided on the main-body device, so as to make it difficult to detach the junction cable from the main-body device, as required.

According to each of the above-described embodiments, the length of the junction cable is set to one-fourth of the length of the corresponding broadcast wave, and the length of the junction cable and the cable of the set of earphones is set to three-fourth of the length of the corresponding broadcast wave. However, without being limited to the above-described configurations, each of the above-described lengths may be determined to be n-fourth of the length of the corresponding broadcast wave so that the same effects as those of the above-described embodiments can be obtained. Here, the sign n denotes an odd number.

According to each of the above-described embodiments, the antennas ready for the two frequency bands corresponding to the low-band tuner and the high-band tuner are provided. However, without being limited to the above-described configurations, an antenna specifically designed for a high-frequency band may be provided. In that case, the filter circuit provided at the end of the junction cable, the end being provided on the main-body-device side, may be omitted so that the antenna part and the transmission part are fully insulated from each other.

According to each of the above-described embodiments, the digital radio broadcast is received by using the high-band tuner. However, without being limited to the above-described configurations, a digital television broadcast may be received by using the high-band tuner, for example.

Further, according to each of the above-described embodiments, the antenna includes the path used to transmit the audio signal driving the set of earphones. However, without being limited to the above-described configurations, the antenna may be formed by using a path used to transmit an audio signal, such as a line output, a path used to transmit a signal other than the audio signal, such as a video signal, a path used to transmit anything other than a signal, such as power of a commercial power supply, various types of direct-current power supplies, etc.

It should be understood by those skilled in the art that various modifications, combinations, sub-combinations and alterations may occur depending on design requirements and other factors insofar as they are within the scope of the appended claims or the equivalents thereof.

What is claimed is:

1. A reception device comprising:

a transmission part including a plurality of stranded wire transmission cables configured to transmit a signal and/or power generated in a main-body device;

an antenna part including a plurality of stranded wire antenna cables that are provided alongside the transmission cables from of the transmission part from ends of the transmission cables of the transmission part provided on the main-body-device side to a predetermined point between the main-body-device-side ends and the other ends of the transmission cables of the transmission part so that the antenna part and the transmission part form a path used to transmit a high-frequency signal;

a high-frequency-elimination circuit that is provided in the main-body device and operatively connected to the main-body-device-side ends of the transmission cables, and that is configured to eliminate entry of the high-frequency signal from at least one of the transmission cables to the main-body device; and a tuner that is configured to operatively connect the main-body-side ends of the antenna cables to an antenna-input terminal and that is configured to receive a broadcast wave falling within a first frequency band, where the first frequency band corresponds to a length of the antenna part, wherein, the other end of the antenna are unconnected, the transmission and antenna parts stand in parallel and at a predetermined distance each other, a first stranded-wire part is configured as the transmission part and includes one ground line and two audio lines configured to transmit an audio signal generated in the main-body device to at least one speaker, a second stranded-wire part is configured as the antenna part and is connected to the ground line, the antenna part works as a first antenna used for a high reception frequency, and the transmission part and a cable of the at least one speaker work as a second antenna used for a low reception frequency.

2. The reception device according to claim 1, wherein:

the at least one speaker is provided on the other ends of the transmission cables; and the signal generated in the main-body device is an audio signal which drives the at least one speaker.

3. The reception device according to claim 2, wherein at least one jack and at least one plug that relay the transmission cables are provided at a predetermined site defined on one of the ends of the antenna part provided on the speaker side.

4. The reception device according to claim 1, wherein:

one of the audio lines of the transmission part is configured to transmit an audio signal of a right channel, the other one of the audio lines of the transmission part is configured to transmit an audio signal of a left channel, and the ground line is ready for the audio signals of the right and left channels;

the number of the antenna cables is the same as that of the transmission cables; and the transmission cables are operatively connected to the main-body-device-side ends of the antenna cable and the antenna cables are connected to the antenna-input terminal.

5. The reception device according to claim 1, wherein a length of the antenna part is set to about n-fourth of the length of a broadcast wave falling within the first frequency band, where n denotes an odd number.

6. The reception device according to claim 1, wherein:

the main-body-device-side ends of the transmission cables and the main-body-device-side end of the antenna cables are operatively connected to each other through a filter circuit; and the tuner further receives a broadcast wave falling within a second frequency band, where the second frequency band corresponds to a length of the transmission cables.

7. The reception device according to claim 6, wherein the length of the transmission cables is set to about n-fourth of a length of the broadcast wave falling within the second frequency band.

8. An antenna operatively connected to a main-body device configured to receive a broadcast wave falling within a predetermined frequency band, the antenna comprising:

a transmission part including a plurality of stranded wire transmission cables configured to transmit a signal and/or power generated in the main-body device; and an antenna part including a plurality of stranded wire antenna cables that are provided alongside the transmission cables of the transmission part from ends of the transmission cables of the transmission part, provided on the main-body-device side, to a predetermined point between the main-body-device-side ends and the other ends of the transmission cables of the transmission part so that the antenna part and the transmission part form a path used to transmit the broadcast wave, wherein, one ends of the antenna cables opposite to main-body-device side ends are unconnected, the main-body-device-side ends of the transmission cables are operatively connected to a high-frequency-elimination circuit provided in the main-body device and that eliminates entry of a high-frequency signal to the main-body device, the main-body-device-side ends of the antenna cables are operatively connected to an antenna-input terminal of a tuner unit configured to receive a broadcast wave falling within a first frequency band, where the first frequency band corresponds to a length of the antenna part, the transmission and antenna parts stand in parallel and at a predetermined distance from each other, a first stranded-wire part is configured as the transmission part and includes one ground line and two audio lines configured to transmit an audio signal generated in the main-body device to at least one speaker, a second stranded-wire part is configured as the antenna part and is connected to the ground line, the antenna part works as a first antenna used for a high reception frequency, and the transmission part and a cable of the at least one speaker work as a second antenna used for a low reception frequency.

9. A junction cable configured to relay a signal and/or power generated in a main-body device including a tuner to an external cable, where one of ends of the junction cable is operatively connected to the main-body device via a connecter, and the other end of the junction cable is operatively connected to the external cable, the junction cable comprising:

a transmission part including a plurality of stranded wire transmission cables configured to transmit the signal and/or the power; and an antenna part including a plurality of stranded wire antenna cables that are provided alongside the transmission cables of the transmission part so that the antenna part and the transmission part form a path used to transmit a broadcast wave, wherein, one ends of the antenna cables provided on the external-cable side are unconnected, main-body-device side ends of the transmission cables are operatively connected to a high-frequency-elimination circuit via the connecter, where the high-frequency-elimination circuit is provided in the main-body device and is configured to eliminate entry of a high-frequency signal to the main-body device, main-body-device side ends of the antenna cables are operatively connected to an antenna-input terminal of the tuner configured to receive a broadcast wave falling within a first frequency band via the connector, where the first frequency band corresponds to a length of the antenna part, the transmission and antenna parts stand in parallel and at a predetermined distance from each other, a first stranded-wire part is configured as the transmission part and includes one ground line and two audio lines configured to transmit an audio signal generated in the main-body device to at least one speaker, a second stranded-wire part is configured as the antenna part and is connected to the ground line, the antenna part works as a first antenna used for a high reception frequency, and the transmission part and a cable of the at least one speaker work as a second antenna used for a low reception frequency.

* * * * *